United States Patent
Oliver et al.

(10) Patent No.: US 10,608,884 B2
(45) Date of Patent: Mar. 31, 2020

(54) METHOD AND APPARATUS FOR PROVIDING DEVICE COMPATIBILITY INFORMATION

(71) Applicant: Conversant Wireless Licensing S.a r.l., Luxembourg (LU)

(72) Inventors: Ian Justin Oliver, Soderkulla (FI); Sergey Boldyrev, Soderkulla (FI)

(73) Assignee: Conversant Wireless Licensing S.a r.l., Luxembourg (LU)

(*) Notice: Subject to any disclaimer, the term of this patent is extended or adjusted under 35 U.S.C. 154(b) by 1022 days.

(21) Appl. No.: 13/728,742

(22) Filed: Dec. 27, 2012

(65) Prior Publication Data

US 2013/0117431 A1  May 9, 2013

Related U.S. Application Data

(63) Continuation of application No. 12/569,753, filed on Sep. 29, 2009, now Pat. No. 8,478,812.

(51) Int. Cl.
  *H04L 12/24* (2006.01)
  *H04L 29/08* (2006.01)
  *G06F 9/50* (2006.01)

(52) U.S. Cl.
  CPC .......... *H04L 41/12* (2013.01); *G06F 9/5055* (2013.01); *H04L 67/2814* (2013.01); *H04L 67/303* (2013.01); *H04L 67/16* (2013.01)

(58) Field of Classification Search
  CPC ........ H04L 41/12; H04L 67/16; H04L 67/303
  USPC .................................................. 709/220–223
  See application file for complete search history.

(56) References Cited

U.S. PATENT DOCUMENTS

| | | | |
|---|---|---|---|
| 6,098,093 A | 8/2000 | Bayeh et al. | |
| 6,164,547 A | 12/2000 | Vapaakoski et al. | |
| 6,249,804 B1 | 6/2001 | Lam | |
| 7,035,828 B2 | 4/2006 | Ketonen et al. | |
| 7,139,792 B1 | 11/2006 | Mishra et al. | |
| 7,155,681 B2 | 12/2006 | Mansour et al. | |
| 7,647,392 B2* | 1/2010 | Sharma | G06Q 10/0875 709/223 |
| 7,735,079 B1 | 6/2010 | Davis et al. | |
| 8,112,508 B1* | 2/2012 | Ambrose | G06F 9/542 709/223 |
| 2001/0056459 A1* | 12/2001 | Kurose | H04L 12/5695 709/201 |
| 2002/0065925 A1 | 5/2002 | Kenyon et al. | |
| 2005/0015505 A1 | 1/2005 | Kruis et al. | |
| 2005/0204045 A1* | 9/2005 | Belkin | G06F 9/5027 709/227 |

(Continued)

*Primary Examiner* — Minh Chau Nguyen
(74) *Attorney, Agent, or Firm* — Conversant Wireless Licensing

(57) ABSTRACT

An approach is provided for determining device compatibility using alerts and information spaces. A link redirector receives a request from a device for a required type of service. The link redirector alerts the device compatibility service and the export control interface about the potential request or stores the request information in an information space while searching for a suitable service for the device. Therefore, the device compatibility service and the export control interface can start preparing information about device compatibility and export control before the information is requested by the service determined.

20 Claims, 15 Drawing Sheets

(56) References Cited

U.S. PATENT DOCUMENTS

| | | | |
|---|---|---|---|
| 2006/0094419 A1* | 5/2006 | Katou | G06F 11/1451 455/425 |
| 2006/0218396 A1* | 9/2006 | Laitinen | H04L 9/0838 713/167 |
| 2007/0041330 A1* | 2/2007 | Bostica | H04W 24/00 370/252 |
| 2007/0286380 A1 | 12/2007 | Hong et al. | |
| 2008/0140760 A1 | 6/2008 | Conner et al. | |
| 2008/0228503 A1 | 9/2008 | Buchheit | |
| 2008/0282162 A1* | 11/2008 | Lincke | H04L 29/06 715/710 |
| 2009/0106350 A1 | 4/2009 | Chen et al. | |
| 2009/0177878 A1 | 7/2009 | Gao et al. | |
| 2009/0286512 A1* | 11/2009 | Huber | G06Q 20/1235 455/411 |
| 2010/0235525 A1* | 9/2010 | McGuire | H04L 61/1511 709/228 |
| 2011/0196962 A1* | 8/2011 | Radier | H04W 4/02 709/224 |
| 2015/0263902 A1* | 9/2015 | He | G06F 9/5072 709/226 |

\* cited by examiner

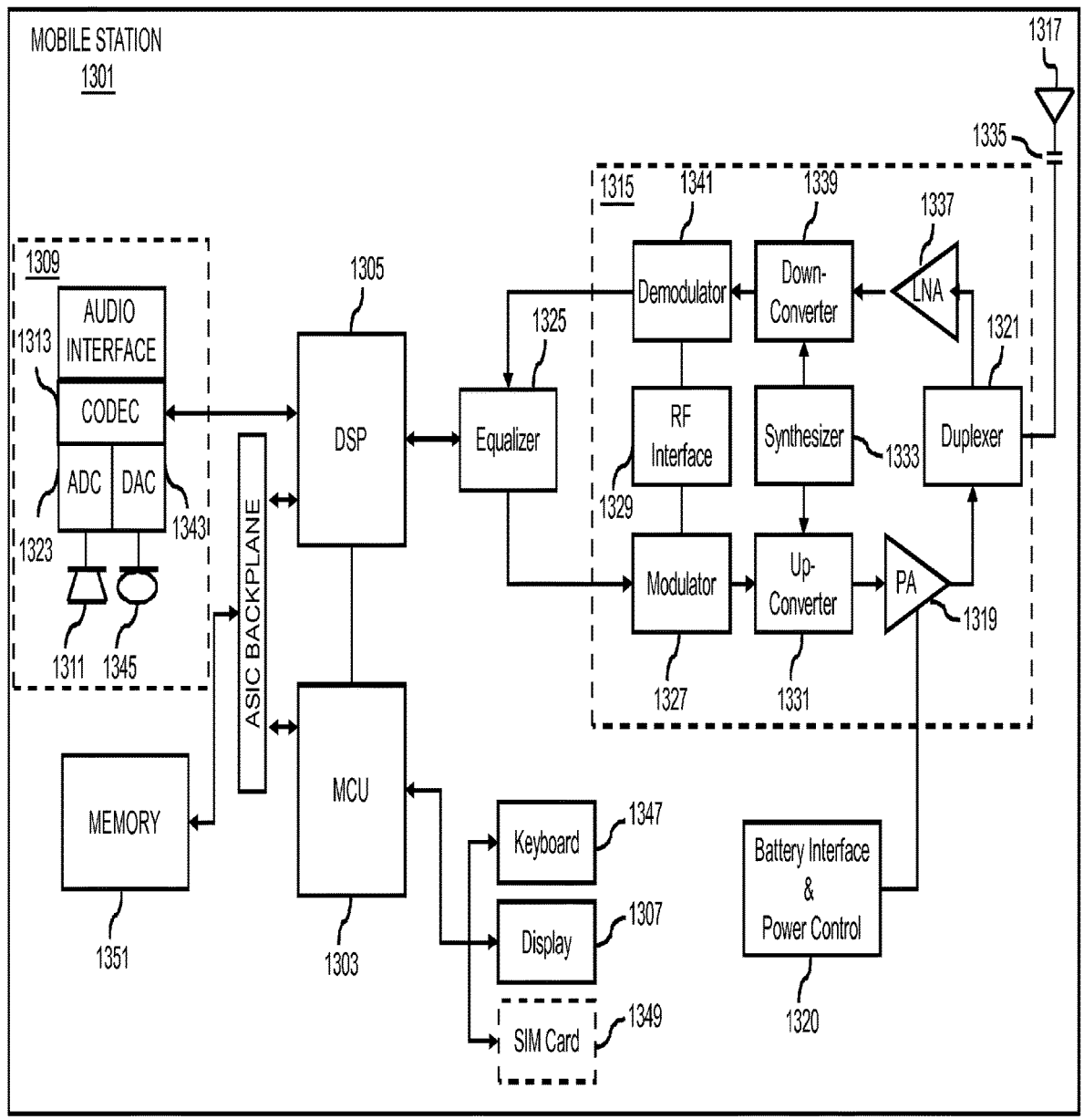

METHOD AND APPARATUS FOR PROVIDING DEVICE COMPATIBILITY INFORMATION

BACKGROUND

Service providers (e.g., wireless, cellular, etc.) and mobile device manufacturers are continually challenged to deliver value and convenience to consumers by, for example, providing compelling network services. With the large variety of operating systems, processor speeds, screen sizes, memory sizes, media capabilities and other characteristics of mobile devices, it is difficult for developers of mobile services and applications to know how many and which devices are able to run effectively the service client or application being developed. Similarly, it is difficult for a user of one mobile device to know what applications and services executing on mobile devices of others will also run effectively on the user's device.

SOME EXAMPLE EMBODIMENTS

Therefore, there is a need for an approach for determining device compatibility in an efficient manner to ensure effective and timely execution of developed services and applications.

According to one embodiment, a method comprises receiving a first request, from a client, to access a service. The service is adapted according to one or more characteristics of the client and the request includes device identification data associated with the client. The method also comprises determining a service platform corresponding to the requested service. The method further comprises redirecting the first request to the determined service platform. The method further comprises causing at least in part transmission of the device identification data to a device compatibility service to alert the device compatibility service of a potential second request originating from the determined service platform for device compatibility information. The alert triggers preparations by the device compatibility service to respond to the potential second request before receiving the potential second request from the determined service platform.

According to another embodiment, an apparatus comprising at least one processor, and at least one memory including computer program code, that at least one memory and the computer program code configured to, with the at least one processor, cause the apparatus to receive a first request, from a client, to access a service. The service is adapted according to one or more characteristics of the client and the request includes device identification data associated with the client. The apparatus is also caused to determine a service platform corresponding to the requested service. The apparatus is further caused to redirect the first request to the determined service platform. The apparatus is further caused to cause at least in part transmission of the device identification data to a device compatibility service to alert the device compatibility service of a potential second request originating from the determined service platform for device compatibility information. The alert triggers preparations by the device compatibility service to respond to the potential second request before receiving the potential second request from the determined service platform.

According to another embodiment, a computer-readable storage medium carrying one or more sequences of one or more instructions which, when executed by one or more processors, cause an apparatus to receive a first request, from a client, to access a service. The service is adapted according to one or more characteristics of the client and the request includes device identification data associated with the client. The apparatus is also caused to determine a service platform corresponding to the requested service. The apparatus is further caused to redirect the first request to the determined service platform. The apparatus is further caused to cause at least in part transmission of the device identification data to a device compatibility service to alert the device compatibility service of a potential second request originating from the determined service platform for device compatibility information. The alert triggers preparations by the device compatibility service to respond to the potential second request before receiving the potential second request from the determined service platform.

According to yet another embodiment, an apparatus comprises means for receiving a first request, from a client, to access a service. The service is adapted according to one or more characteristics of the client and the request includes device identification data associated with the client. The apparatus also comprises means for determining a service platform corresponding to the requested service. The apparatus further comprises means for redirecting the first request to the determined service platform. The apparatus further comprises means for causing at least in part transmission of the device identification data to a device compatibility service to alert the device compatibility service of a potential second request originating from the determined service platform for device compatibility information. The alert triggers preparations by the device compatibility service to respond to the potential second request before receiving the potential second request from the determined service platform.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 13 is a diagram of a mobile terminal (e.g., handset) that can be used to implement an embodiment of the invention.

DESCRIPTION OF SOME EMBODIMENTS

A method and apparatus for timely providing device compatibility are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to application developers for mobile communication devices (e.g., wireless devices such as cellular telephones), it is contemplated that the approach described herein may be used in other contexts, such as by network applications, or modules executing as part of a social service, or by individual users or subscribers to a network service.

Figure 1:
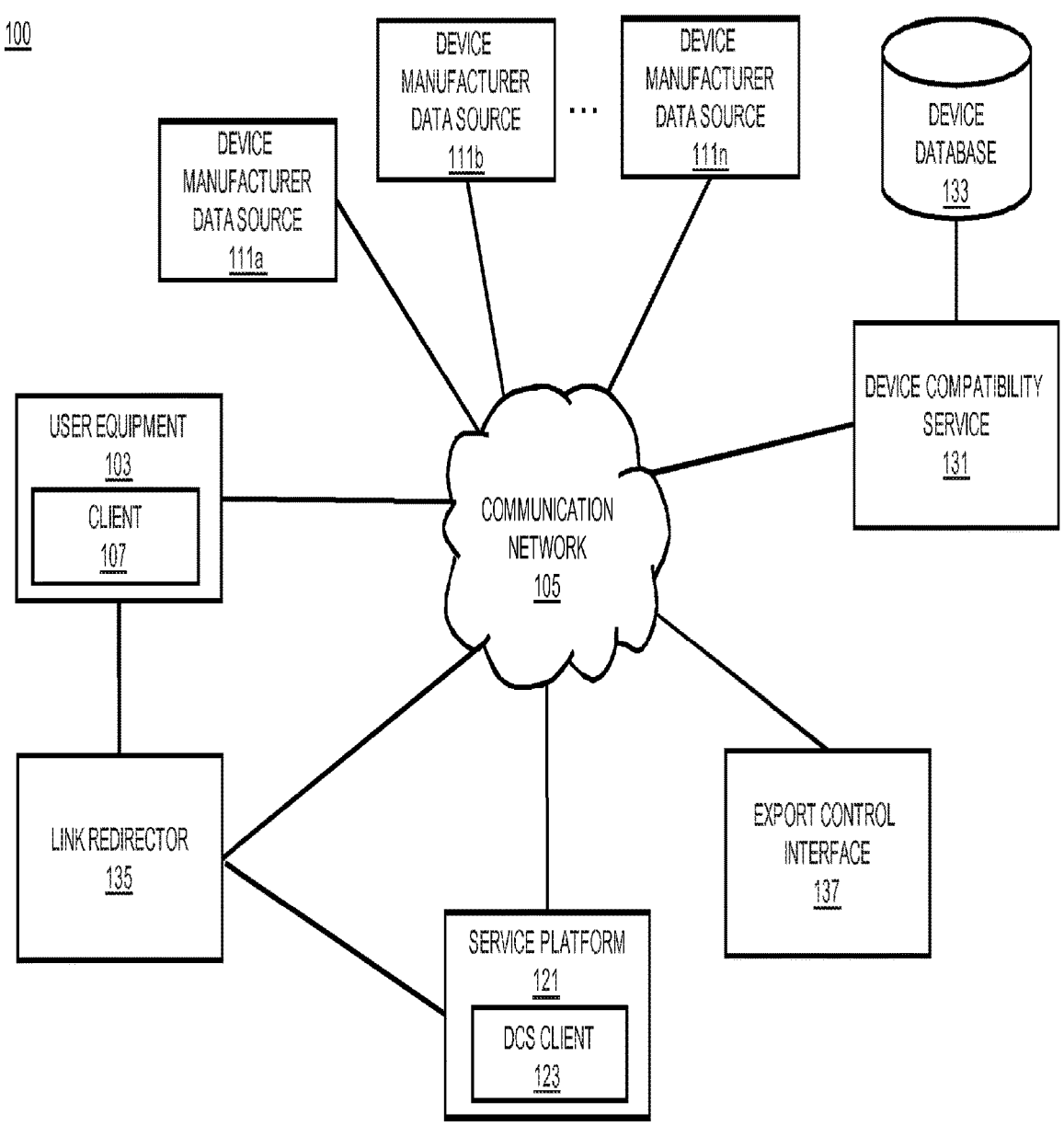
FIG. 1 is a diagram of a system capable of determining device compatibility, according to one embodiment.

FIG. 1 is a diagram of a system capable of determining device compatibility, according to one embodiment. A developer of an application or service for use on a communication device relies on the hardware and software available on the communication device to implement some or all of the functionality to support the service or application. In one embodiment, a communication device can be a mobile device, a personal computer, or any other type of communication equipment. Some services are stand alone applications and, once installed, operate entirely on the communication device. Some services rely on a standard or special purpose client process on the device interacting across a network with, for instance, a server process executing on another node of the network, typically a node with more computing power.

Because of the wide variety of communication device characteristics, it is unlikely that any but the most simple service or application is able to execute effectively on all such devices. There are many characteristics of importance to the developer, such as the screen size of the communication device, the operating system of the device, the processing power of the device, the type of media the device can render, and the type of input a user of the device can enter, among many others, described in more detail below.

For example, the client-server model of computer process interaction is widely used. According to the client-server model, a client process sends a message including a service request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the service request, or the host computer on which the process operates. As used herein, the terms "client" and "server" refer to the processes, rather than the host computers, unless otherwise clear from the context. In addition, the server process can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. Some services or applications rely on a web browser on the client. To support small screens available on many mobile communication devices, Web pages are converted to reduced representations and transmitted to mobile communication devices using the Wireless Application Protocol (WAP).

Typically, the developer has a particular device, or family of devices, in mind when the service or application is being developed; and, the developer knows the characteristics of that device or family. However, in trying to promote the service or application, it would be useful to know what other extant or emerging devices can effectively execute the functionality of the service or application. The developer would be interested in a technique to specify the characteristics of the device invoked by the service or application, and determine all other communication devices that possess the invoked characteristics or more.

Furthermore, a user of a particular device may want to know what other services and applications can run effectively on that particular device. For example, the user has a friend who is employing an interesting service or application, and the user is interested in knowing whether the application or service will run on the user's device. In some cases, a user of a particular device is thinking of changing an older device and wants to know what currently available devices can effectively run all the applications and services that the user currently employs or intends to employ.

In yet other applications, a developer might want to adapt a service to perform differently for different device capabilities, running or installing a faster, lighter version of the service (using less memory and CPU) for less capable devices.

Therefore, there is a need to determine device compatibilities. However, the process for determining device compatibility can be relatively time consuming particularly when the device compatibility information is provided by multiple sources that can be physically located in distant locations and over multiple networks. The time delay for responding to a device compatibility request can be particularly problematic for a developer or service provider who relies on timely device compatibility information to tailor services according to device characteristics. It is contemplated that the service provider may provide any service (e.g., a mapping service, a multi-media service, news service, etc.) that can be provided over a communication network. For example, even though a service provider may be capable of responding quickly to a service request from a user, the response may nonetheless be delayed since the service is not be provided until the device compatibility is determined. This delay can degrade the experience the user perceives when using the service.

In one sample use case, for instance, a user may request a streaming video from a multimedia service. To respond to the request, the multimedia service generates a device compatibility request to determine the display characteristics (e.g., screen resolution, available video codes, bandwidth capability, etc.) to determine the type of stream to provide to the user's device. Conventional processes for determining this device compatibility information can result in a delay between the time the user requests the streaming video and the time multimedia service can provide the requested stream, thereby leading to a potentially unsatisfactory user experience.

To address this problem, a system 100 of FIG. 1 introduces the capability to determine device compatibility in a more efficient manner by alerting or sharing information about a potential device compatibility request with the platforms that provide device compatibility information before the platforms receive the actual request. The early alert or sharing of information provides a warning about the potential upcoming device compatibility request so that the platforms can prepare to respond even before receiving the actual request. In this way, the platforms can respond more quickly when the device compatibility request is finally received at the platforms, thereby reducing or eliminating the delay in providing a response to the requesting service provider. In turn, the service provider can then serve its users more quickly and responsively.

The system 100 includes a device compatibility service 131 executing on a node (not shown) of a network 105 that provides access to the device compatibility service 131. The device compatibility service 131 acquires the device characteristics for multiple devices, e.g., from manuals published by the device manufacturers or websites maintained by those manufacturer or some combination, and stores data indicating those characteristics in a database maintained by the device compatibility service 131. Then, a developer, a process or other user can send queries to the device compatibility service 131 to obtain information about the devices that have a certain characteristic or combination of characteristics, or to obtain information about the characteristics associated with a particular device. Example queries include queries to list out all the characteristics of a specific device, list out partial characteristics of a specific device, list out all the devices with a specific set of values for one or more characteristics, and list out all the devices which are similar to a specific device (e.g., similar values for operating system or media capabilities or mobile application, alone or in some combination).

As shown in FIG. 1, the system 100 comprises a user equipment (UE) 103 having connectivity to a service platform 121 via a communication network 105. In addition, the service platform 121 includes a device compatibility service client process 123 having connectivity to the device compatibility service 131 and the export control interface 137 also via the communication network 105. In one embodiment, the device compatibility service 131 and the export control interface 137 comprise the platforms that respond to device compatibility requests received over the network 105. It is also contemplated that any number of platforms may be used to provide device compatibility information. For example, the device compatibility service 131 gathers device compatibility information from a variety of sources for storage in a device database 133. This information includes specifications and features (e.g., processing capabilities, input methods, display size, memory size, network connections, etc.) for any number of communication devices. The device compatibility service 131 can then use the stored information to respond to device compatibility requests. This information, for instance, can inform the service provider of what types of services and/or what format of the services can be supported on a given device.

The export control interface 137 gathers and stores information about constraints or restrictions on using particular services or devices based on agreements, laws, geographical locations, manufacturers' restrictions, etc. For example, national laws may prevent the use of certain types of services in particular countries. In another example, a music service provider may only have rights to distribute music files in certain countries. Accordingly, the export control interface 137 records such restrictions and provides any applicable restrictions in response to device compatibility requests. In this way, the export control interface 137 can supplement the physical compatibility information provided by the device compatibility service 131 with compatibility information (e.g., regional restrictions, etc.) based on agreements.

As shown in FIG. 1, the UE 103 may have either direct connectivity to the service platform 121 or indirect connectivity via the link redirector 135. Similarly, the device compatibility service client process 123 may have either direct connectivity to the device compatibility service 131 and the export control interface 137 or indirect connectivity via the link redirector 135. In one embodiment, the link redirector 135 acts as a proxy service by receiving connection requests and directing the service requests to the appropriate network component. More specifically, the link redirector 135 can determine which network component should receive a particular service request based on various criteria such as network load, proximity of service providers, number of users, etc. In the example of FIG. 1, the link redirector 135 can receive service requests from the UE 103 and direct those service requests to the corresponding service platform 121. For example, if one particular service platform 121 is overloaded with service requests, the link redirector 135 may redirect any subsequent service requests to another service platform 121 that is providing the requested service. In this way, the link redirector 135 can perform load balancing to more evenly distribute network traffic among a group of service platforms 121. By way of example, the link redirector 135 may either forward the service request directly to the determined service platform 121 or return an address (e.g., Internet Protocol address) of the determined service platform 121 to the requesting UE 103.

In the illustrated embodiment, multiple data sources 111a, 111b, 111n (collectively referenced hereinafter as data sources 111) for device manufacturers are also connected to network 105. These data sources 111 represent any process executing on a node of network 105 that presents information about communication devices and their characteristics. For example, in some embodiments, one or more of data sources 111 is a web page provided by a web server process on a node of network 105. For example, the device compatibility service 131 and the export control interface 137 can gather device compatibility information from the data sources 111.

As described above, the device compatibility service client process 123 communicates with the device compatibility service 131 and the export control interface 137 to obtain responses to queries about device characteristics about one or more communication devices, such as the UE 103. In the illustrated embodiment, device compatibility service client process 123 is included in a service process 121 that communicates with client process 107 on the UE 103. In this arrangement, a user of the UE 103 can request information about device compatibility from service platform 121, which uses the device compatibility service client 123 to obtain that information from the device compatibility service 131 and the export control interface 137. Also in this arrangement, a user of the UE 103 can request service from service platform 121, which uses the device compatibility service client 123 to obtain information about the capabilities of UE 103 from the device compatibility service 131 and the export control interface 137, and adapts its response to the client 107 based on the capabilities of UE 103 obtained from the device compatibility service 131 and the export control interface 137.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 103 and the hosts (not shown) for service process 121 and device compatibility service 131 are any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 103 can support any type of interface to the user (such as "wearable" circuitry, etc.). In the illustrated embodiment, UE 103 is a mobile communication device connected to network 105 through wireless link 107.

Moreover, the service platform 121, device compatibility service 131, export control interface 137, link redirector 135, data sources 111, and UE 103, including the client 107 and device compatibility service client 123, communicate with each other and other components of the communication network 105 using well known, new or still developing protocols. In this context, a protocol includes a set of rules defining how the network nodes within the communication network 105 interact with each other based on information sent over the communication links The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Although a particular set of nodes, processes, and data structures, such as databases, are shown in FIG. 1 for purposes of illustration, in various other embodiments more or fewer nodes, processes and data structures are involved. Furthermore, although processes and data structures are depicted as particular blocks in a particular arrangement for purposes of illustration, in other embodiments each process or data structure or portions thereof, may be separated or combined or arranged in some other fashion. For example, in some embodiments, the device compatibility service client 123 is outside of service platform 121, or the service platform 121 and client 107 are omitted. As a further example, in some embodiments, the functions of device compatibility service client 123 are provided by a Web browser interacting with a web page server included in device compatibility service 131 and/or the export control interface 137.

Figure 2:
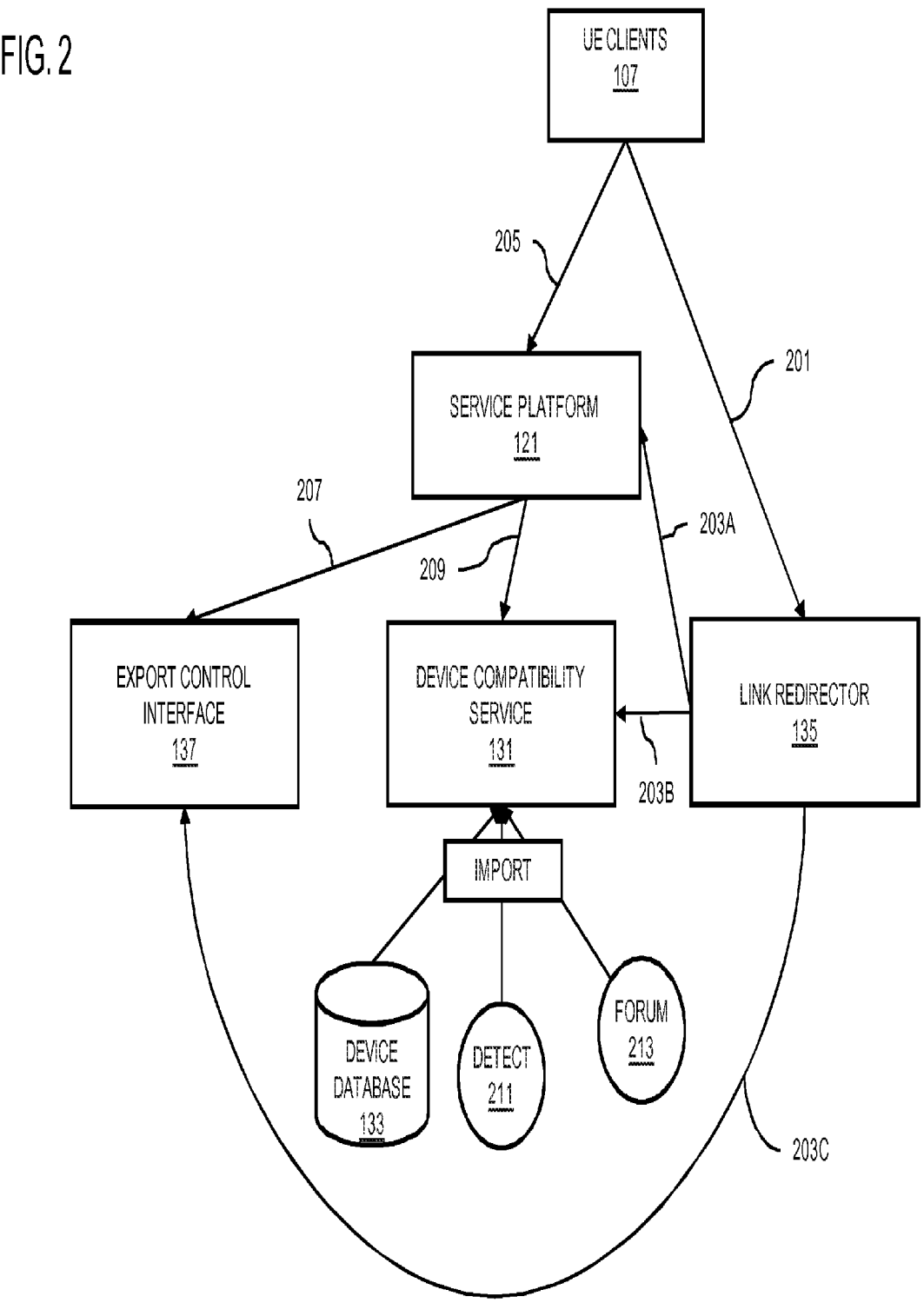
FIG. 2 is a diagram of the components configured for determining device compatibility using alerts, according to one embodiment.

FIG. 2 is a diagram of the components configured for determining device compatibility using alerts, according to one embodiment. In various embodiments, one or more UE clients 107, such as Wireless Receiver/Transmitter (WRT) client, S40 JAVA client, web browsers, etc. on UE (not shown) send a service request via a network (not shown) to a link redirector 135. In some embodiments the service request includes a universal resource locator (URL) name for the service platform 121 or the redirector 135. A service request to the link redirector process 135 is analyzed based on the Internet Protocol (IP) address and other data in the request and directed to an appropriate service, such as the service platform 121. As discussed previously, a link redirector process 135 is used for any number of reasons, including providing user specific services, load balancing or geographic distribution, among other reasons. In some embodiments, the request includes device identification data that indicates a specific UE 103 hosting the client 107 or one or more characteristics of that device that are relevant for the service being requested. In some embodiments, the request includes user profile information that identifies the user as a member of a subscription service, such as a social network service.

In one embodiment, the link redirector 135 receives information, for example from the user/agent field of a service request, that contains information about the client 107 (e.g., information about the device executing the client 107). On receipt of the service request, the link redirector 135 can search for a suitable service provider (server) managed by service platform 121 and then forward the service request to the determined service platform 121 to be sent to the provider. In the approach described herein, the link redirector 135 can also use the information (e.g., device characteristics information) included in the service request to alert the device compatibility service 131 and export control interface 137 about a potential device compatibility request arising from the received service request. For example, the link redirector 135 will have notice that the UE 103 is requesting a service from the service provider platform 111 because the link redirector 135 has received and redirected this service request from the UE 103. Furthermore, because the link director 135 is acting as a proxy, the link redirector 135 receives this notice before the service platform 121 receives the service request. Consequently, the link redirector 135 is in a position to alert the device compatibility platforms (e.g., the device compatibility service 131 and the export control interface 137) of the potential device compatibility request from the service platform 121 as the link redirector is forwarding the service request to the service platform 121. In this way, the device compatibility platforms will already be alerted of the device compatibility requests before the service platform 121 has time to receive the service request from the link redirector 135 and to generate a device compatibility request to the device compatibility platforms.

In one embodiment, these alerts can include identification of requesting device and the service requested to inform the device compatibility service 131 and the export control interface 137 of the service request from user client 107. Upon receiving the alerts, the device compatibility service 131 and the export control interface 137 can each start preparing for a response. For example, the device compatibility service 131 can search the network for information on whether the requested service is compatible with the capabilities of the user equipment 103 or what solutions are available for the compatibility to be achieved. The export control interface 137 can, for example, investigate service availability in the geographical location of the user equipment 103.

The service platform 121 receives the forwarded service request from the link redirector 135. In many cases, the service platform 121 responds to the forwarded service request by generating a device compatibility request to, for instance, the device compatibility service 131 and the export interface 137. For example, the service request can retrieve device compatibility information that will enable the service platform 121 to tailor its service to the requesting device. The service platform 121 then accesses an export control interface 137, if applicable, to determine whether the service being requested, e.g. content download, is permitted from the service platform 121 to the client 107, given the client's user or geographic location. The export control interface 137 has already been alerted about this export information request by the link director 135 and has started preparing a response. By the time the export control interface 137 receives the device compatibility request from the service platform 121, the export control interface 137 may have already prepared the response and, therefore, can send the response to service platform 121 immediately. Similarly, the service platform 121 can also determine how to provide service tailored to the UE 103 by contacting the device compatibility service 131. Since the device compatibility service 131 has also received the alert from link director 135, the device compatibility service 131 can already have the response to the device compatibility request at least partly ready and, therefore, can provide the service platform 121 with the response immediately or with a shorter delay. In this way, the approach described herein advantageously reduces the delay associated with responding to the device compatibility request.

Generally, the process of determining device compatibility can be significantly time consuming because of factors such as network delays and client processing power available for performing device compatibility queries. The device compatibility service 131 and export control interface 137 are more than likely running on more powerful hardware with faster network connections. For the most part, it might even be typical that these modules along with the link redirector 135 are installed on the same machine/cluster. Taking advantage of this locality, the information contained in the service request to the link redirector 135 can be passed to these modules through alerts such that they can start preloading and caching information pertinent to the request.

Furthermore, the link redirector 135 can generate a session key that is returned to the client 107 and is also passed to the device compatibility service 131 and export control interface 137. This session key can be used to more quickly and easily associate alerts with their corresponding service requests and device compatibility requests so that when the service platform 121 contacts these device compatibility modules its service request can received expedited treatment.

The advantage of this approach is that the device compatibility service 131 and the export control interface 137 will have the necessary information about the client 107 and its capabilities already in cache or memory and ready for processing. In addition, analysis of such information can reveal trends about the kinds of interfaces and capabilities that are being used by clients over time. This trend information can then inform the service platform 121 about what device compatibility information should be cached for future use.

Thus, as depicted in FIG. 2, in network communications indicated by arrows 201 through 209, the following actions take place. Per step 201, client 107 connects to the link redirector 135, identifies itself and requests to be redirected to a service such as video stream or music download, software script download, etc. In step 203A, the link redirector 135 forwards the service request to the service platform 121 to be processed. A service request includes information used by the service platform 121 for processing, for example, user equipment specification, model, built-in sensors, memory size, information about the requested service, etc.

In one embodiment, the link redirector 135 can preprocess the service request, find a suitable service provider, and forward the service request together with the identification of the provider to the service platform 121 so that the platform 121 can forward the service request to the provider. In other embodiments, the link redirector 135 may send the service request to the service platform 121 and the search for a suitable provider can be performed at the service platform 121. Per step 203B the link redirector 135 sends the service request including client 107 identification and requested service to the device compatibility service 131. Upon receiving the information, the device compatibility service 131 can start investigating the compatibility features of the client 107 with device requirements of the requested service. For example if a requested service only runs on equipment with a certain processor speed or needs a certain amount of available memory to run properly, the device compatibility service 131 investigates whether the requesting client 107 the requirements. In step 203C the link redirector 135 sends the service request including client 107 identification and requested service to the export control interface 137. Upon receiving the information, the export control interface 137 can start investigating the features of the client 107 with export requirements of the requested service. For example, if a requested service has a copyright restriction for some locations, the export control interface 137 investigates whether the requesting client 107 is located in a proper zone where access to the requested service is allowed.

Steps 203A, 203B and 203C can be performed concurrently or in any sequence. In step 205, client 107 connects to the service platform 121 front-end and requests the service. Upon receiving the service request the service platform 121 sends client 107 identification (e.g. IP address) to the export control interface 137 per step 207, and the export control interface 137 responds with the results of the investigation (e.g., copyright information). Based on these results the service platform 121 will make an export control decision. In step 209, the service platform 121 sends client 107 identification (e.g. IP address) to the device compatibility service 131, which responds with the results of the investigation (e.g., the client 107 device has proper memory size for requested service, etc.). The device compatibility service 131 uses information in a device database 133, or detected by a detect process 211, or provided by a forum process 213 of the subscription service, if any, to provide a response to the service platform 121. The device database 133 includes information such as the history of device usage, past compatibility issues, device manuals provided by manufacturer, etc. The detect process 211 is an automated process for detecting device specifications and compatibility through methods such as testing. A forum process 213 uses the information exchanged among device users during conversations in various online forums and extracts device compatibility information from collected information. The service platform 121 then provides a response to the UE client 107 based on the capabilities of the UE 103 device that is hosting the client 107. Based on these results the service platform 121 will provide the suitable service to the client 107 or alerts the client of incompatibility with the service.

In addition or alternatively, the alerts provided to the device compatibility service 131 and/or the export control interface 137 may be shared using a shared information space without direct communications between the link redirector 135 and either the device compatibility service 131 or the export control interface 137. In the system described in FIG. 2, information is explicitly passed between the modules. The system can be modified to pass or share all information into a common information space such that any of the modules can obtain information from the space as and when necessary. This approach would provide two-way implicit communication between any two modules in the system through a shared medium such as the information space.

Figure 3:
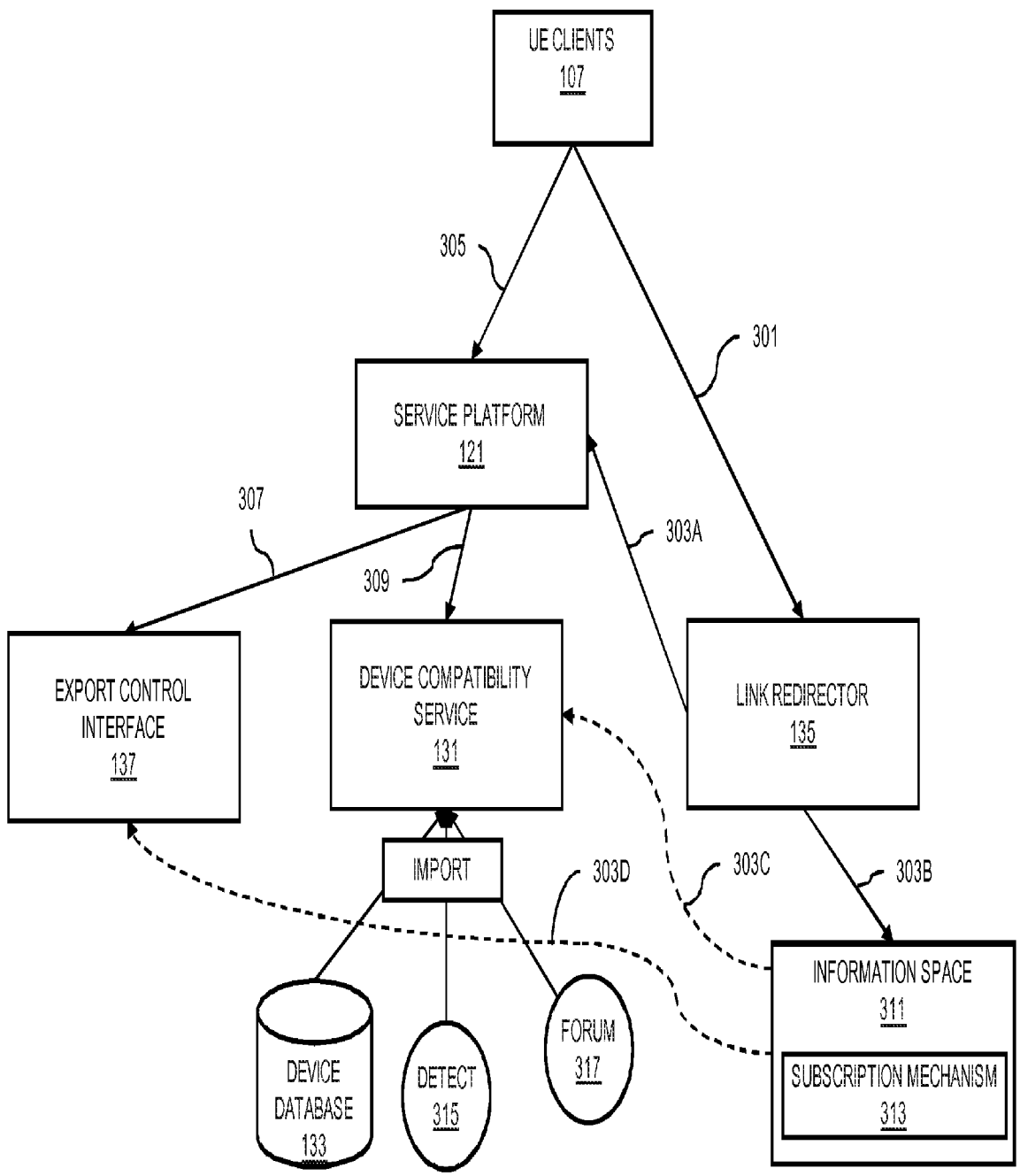
FIG. 3 is a diagram of the components configured for determining device compatibility using shared information spaces, according to one embodiment.

FIG. 3 is a diagram of the components configured for determining device compatibility using shared information spaces, according to one embodiment. In various embodiments, one or more UE clients 107, such as Wireless Receiver/Transmitter (WRT) client, S40 JAVA client, web browsers, etc. on UE (not shown) send a service request via a network (not shown) to a link redirector 135. Information spaces are spaces of highly dynamic (i.e. changing) information and the users of that information would have the responsibility for its interpretation. The users of the information—known as knowledge processors—have processing capabilities for reasoning, modifying and analyzing the information and operate autonomously and anonymously with respect to each other. An information space is a self-contained environment in which information can be placed, shared and acted upon by knowledge processors. Within each space, reasoning takes place according to local conventions (local logics).

Figure 4:
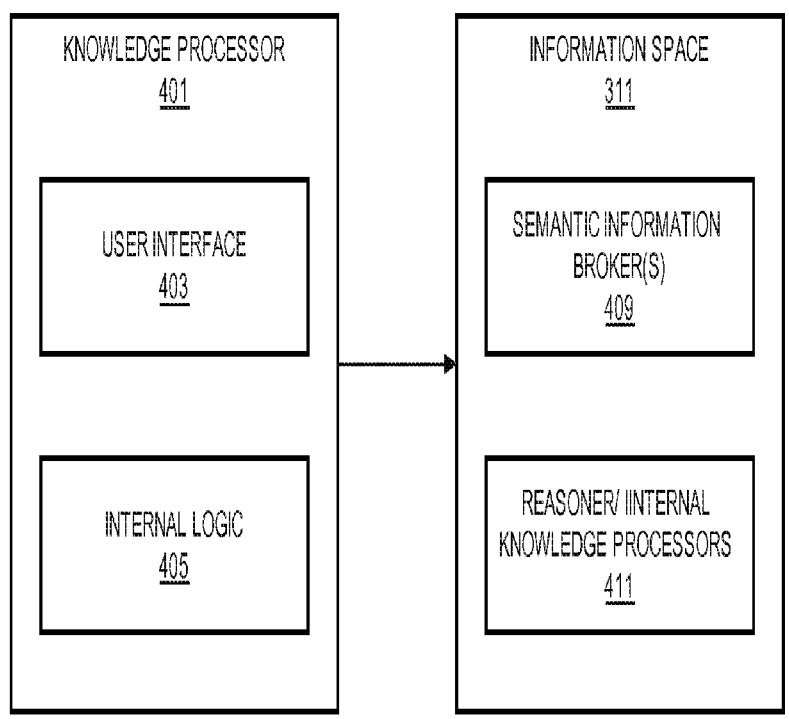
FIG. 4 is a diagram of an architecture for an information space used for determining device compatibility, according to one embodiment.

FIG. 4 is a diagram of an architecture for an information space used for determining device compatibility, according to one embodiment. As shown, system 400 can be considered a publish/subscribe system, which includes one or more distributed knowledge processors 401; each processor 401 that includes user-interface 403 and the internal logic 405 as well as a connectivity layer (not shown). Also, one or more information spaces 311 include semantic information brokers (SIB) 409 and reasoner knowledge processors 411.

By way of example, knowledge processor 401 generally runs on a single device, but may also be distributed across multiple devices. Such a device may be a mobile device/phone, personal computer, active sensor, Radio Frequency Identification (RFID) tag, etc. User interface 403 is an optional component that exists in many smaller dashboard type of applications (e.g., NOKIA Widsets, OSX dashboard, etc.) to provide for interaction with and control of the contents of information spaces 311.

The connectivity component of the knowledge processor 401 (not shown) contains the logic and functionality to communicate to various information spaces 311. Connectivity is over some network protocol to a semantic information broker (SIB) 409. A semantic information broker 409 contains the logic for parsing messages and pointers to subscription handlers between the knowledge processor 401 and the information space 311. A knowledge processor 401 may potentially connect to more than one information spaces at a time thus distributing and synchronizing the operations across all connected information spaces.

The basic functionality provided by the connectivity protocols at this level for manipulating information and for connection to an information space 311 is given in Table 1 below:

TABLE 1

Insert: insert information in information space 311 (as an RDF graph) atomically (e.g., at the level of the smallest information element of the information space 311),
Retract: remove information from information space 311 (as an RDF graph) atomically,
Update: update information on information space 311 (as an RDF graph) atomically - often implemented as a retract and insert through the transaction system,
Query: synchronously (blocking) query; retrieve information from information space 311,
Subscribe: asynchronously (persistent, non-blocking) set up a subscription to the information space 311 for a given query,
Unsubscribe: terminate a given subscription to information space 311,
Join: request initiation of an interaction session between a knowledge processor 401 and a given information space 311, TABLE 1-continued Leave: terminate the current interaction sessions between a knowledge processor 401 and the information space 311.

The information space 311 is "virtual" in nature in the sense that its existence is provided by the underlying semantic information brokers 409, which are elements that "physically" exist. Within the scope of an information space 311, capabilities for local reasoning over the information contained in that information space are provided through a deductive closure calculation mechanism (not shown). The mechanisms for managing connections and operations of knowledge processors 401 and for distributing the information around information spaces 311 can be implemented by more than one SIB 409 distributed over different processing elements.

The interaction among knowledge processors 401 and information spaces 311 is accomplished by network connections to one or more SIBs 409 providing or representing the information space. As far as the user or designer of a knowledge processor 401 is concerned, there are knowledge processors 401 and information spaces 311; and the connectivity layer abstracts away the physical connection to a SIB 409.

When implemented internally within an information space 311, knowledge processors can be known as reasoners 411 and can operate based on a particular scheduling. These reasoners 411 have the same rights as other knowledge processes 401 with the additional constraints of restricted membership. The reasoners 411 do not have the ability to subscribe for information, however, they are given access to the information that they need to process. The reasoners 411 also receive guaranteed execution quanta, unlike 'external' knowledge processors 401 which are at the mercy of network and processor latencies, etc.

In one embodiment, the reasoners (internal knowledge processors) 411 are used for truth maintenance, belief revision, information consistency management, information creation or any other atomic processing required by that information space 311. They are used for the more expansive reasoning about information and more dynamic customization of the properties of a given information space than the rewrite engine based deductive closure mechanism.

The underlying network protocol typically used by system 400 is Transmission Control Protocol/Internet Protocol (TCP/IP), although messaging may be made over any suitable protocol and medium such as Simple Object Access Protocol (SOAP), Bluetooth, etc.

The information space 311 has semantic information brokers (SIBs) 409 equipped with the required "listeners" (components which provide access via any given specified transport protocol) for the given network connectivity protocols. The SIBs 409 can be provided as a service in service oriented architecture (SOA) domains.

The information spaces 311 can be represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. For example, RDF is a family of World Wide Web Consortium (W3C) specifications originally designed as a metadata data model. RDF has come to be used as a general method for conceptual description or modeling of information that is implemented in web resources; using a variety of syntax formats. The underlying structure of any expression in RDF is a collection of triples, each includes three disjoint sets of nodes including a subject, a predicate and an object. A subject is an RDF Uniform Resource Identifier (URI) reference (U) or a Blank Node (B), a predicate is an RDF URI reference (U), and an object is an RDF URI reference (U), a literal (L) or a Blank Node (B). A set of such triples is called an RDF graph. Table 2 shows sample RDF triples.

TABLE 2

| Subject | Predicate | Object |
| --- | --- | --- |
| uri://....../rule#CD-introduction, | rdf:type, | uri://............/Rule |
| uri://....../rule#CD-introduction, | uri://....../rule#assumption, | "c" |

Referring back to FIG. 3, the information space 311 can have a subscription mechanism 313 that provides information security by allowing access to the information only to the subscribed entities (modules, devices, etc.). The link redirector 135, the device compatibility service 131 and the export control interface 137 are subscribed to the information space 311 via subscription mechanism 313.

In one embodiment, the link redirector 135 receives information, for example, from the user/agent field of a service request that contains information about the client 107 (e.g., information about the device executing the client 107). On receipt of the service request, the link redirector 135 can search for a suitable service provider (server) managed by service platform 121 and then forward the service request to the service platform 121 to be sent to the provider (not shown). In the approach described herein, the link redirector 135 can store the information (e.g., device characteristics information) included in the service request in a information space 311 which is shared between link redirector 135, device compatibility service 131 and export control interface 137. For example, the link redirector 135 will have notice that the UE 103 is requesting a service from the service platform 121 because the link redirector 135 has received and redirected this service request from the UE 103. Furthermore, because the link redirector 135 is acting as a proxy, the link redirector 135 receives this notice before the service platform 121 receives the service request. Consequently, the link redirector 135 is in a position to store information about the potential device compatibility request from the service platform 121 in information space 311 as the link redirector is forwarding the service request to the service platform 121.

The link redirector 135 uses a knowledge processor 401 that may be internal to the link redirector 135 or externally connected to the link redirector 135, to insert information of service request from client 107 into the information space 311 as per step 303B of FIG. 3. For the knowledge processor 401 to be able to insert information into the information space 311, it first joins the information space 311. By way of example, the knowledge processor 401 sends a join request to the information space 311 via a connectivity component (not shown). Upon receiving the request, the semantic information broker 409 passes the request to the subscription mechanism 313 for verification of the knowledge processor 401's authority to join the information space 311. If the join is approved, the knowledge processor 401 then inserts the information about the service request in the information space 311. Otherwise, if join is rejected, a warning is issued and communication between the knowledge processor 401 and the information space 311 is terminated. This process protects the contents of information space 311.

The type of subscription of a module to an information space 311 determines the level of access authority for each subscriber and the sharing restrictions for groups of subscribers. Upon insertion of new information in the information space 311, the subscription mechanism 313 can generate signals and send the signals to the device compatibility service 131 and the export control interface 137 that are authorized for sharing the information inserted by the link redirector 135. The signals trigger preparation of responses for the device compatibility request or export control information request. Upon receiving the signals, the device compatibility service 131 and the export control interface 137 send queries to the information space 311 via knowledge processors 401 requesting information about the newly inserted service request from the link redirector 135. The information space 311 verifies the authority of the knowledge processors and if approved, sends query results to the device compatibility service 131 and the export control interface 137 via the knowledge processors 401. Otherwise a warning is issued and communication between the knowledge processors 401 and the information space 311 is terminated. In this way, the device compatibility service 131 and the export control interface 137 can start preparing responses to device compatibility requests and export control requests before the service platform 121 has time to receive the service request from the link redirector 135 and to generate a device compatibility request and an export control request to the device compatibility platforms.

In one embodiment, the signals sent from the information space 311 can include identification of requesting device and the service requested, to inform the device compatibility service 131 and the export control interface 137 of the service request from user client 107. In another embodiment, the signal may only alert device compatibility service 131 and the export control interface 137 of new information in information space 311 so that the device compatibility service 131 and the export control interface 137 can retrieve service request details directly from the information space 311 via queries as explained above.

Upon receiving the information, the device compatibility service 131 and the export control interface 137 can each start preparing for a response. For example, the device compatibility service 131 can search the network for information on whether the requested service is compatible with the capabilities of the user equipment 103 or what solutions are available for the compatibility to be achieved. The export control interface 137 can, for example, investigate service availability in the geographical location of the user equipment 103.

The service platform 121 receives the forwarded service request from the link redirector 135. In many cases, the service platform 121 responds to the forwarded service request by generating a device compatibility request to, for instance, the device compatibility service 131 and the export interface 137. For example, the service request can retrieve device compatibility information that will enable the service platform 121 to tailor its service to the requesting device. The service platform 121 then accesses an export control interface 137, if applicable, to determine whether the service being requested, e.g. content download, is permitted from the service platform 121 to the client 107, given the client's user or geographic location. The export control interface 137 has already been alerted about this service request by the information space 311 and has started preparing a response. By the time the export control interface 137 receives the device compatibility request from the service platform 121, the export control interface 137 may have already prepared the response and, therefore, can send the response to service platform 121 immediately. Similarly, the service platform 121 can also determine how to provide service tailored to the UE 103 by contacting the device compatibility service 131. Since the device compatibility service 131 has also received the alert from information space 311, the device compatibility service 131 can already have the response to the device compatibility request at least partly ready and therefore can provide the service platform 121 with the response immediately or with a shorter delay. In this way, the approach described herein advantageously reduces the delay associated with responding to the device compatibility request.

Thus, as depicted in FIG. 3, in network communications indicated by arrows 301 through 309, the following actions take place. Per step 301, client 107 connects to the link redirector 135, identifies itself and requests to be redirected to a service such as video stream or music download, software script download, etc. In step 303A the link redirector forwards the service request to the service platform 121 to be processed. A service request includes information needed by the service platform 121 for processing, for example, user equipment specification, model, built, memory size, and information about requested service.

In one embodiment, the link redirector 135 can preprocess the service request, find a suitable service provider and forward the service request together with the identification of the provider to the service platform so that the platform can send the service request to that provider. In other embodiments, the link redirector may send the service request to the service platform and the search for a suitable provider can be performed at the service platform 121. Per step 303B, the link redirector 135 stores the service request including client 107 identification and requested service in an information space. In step 303C, the information space 311 sends an alert informing the device compatibility service of a potential device compatibility request. Upon receiving the information, the device compatibility service 131 can start investigating the compatibility features of the client 107 with device requirements of the requested service. For example if a requested service only runs on equipments with a certain processor speed or needs a certain amount of available memory to run properly, the device compatibility service 131 investigates whether the requesting client 107 has the requirements. In step 303D the information space 311 sends an alert informing the export control interface 137 of a potential export control request. Upon receiving the information, the export control interface 137 can start investigating the features of the client 107 with export requirements of the requested service. For example if a requested service has a copyright restriction for some locations, the export control interface 137 investigates whether the requesting client 107 is located in a proper zone where access to the requested service is allowed.

Each pair of steps 303A and 303B and also 303C and 303D can be performed concurrently. In step 305, client 107 connects to the service platform 121 front-end and requests the service. Upon receiving the service request the service platform 121 sends client 107 identification (e.g. IP address) to the export control interface 137 per step 307, and the export control interface 137 responds with the results of the investigation (e.g. copyright information). Based on these results the service platform will make an export control decision. In step 309 the service platform 121 sends client 107 identification (e.g. IP address) to the device compatibility service 131, which responds with the results of the investigation (e.g. the client 107 device has proper memory size for requested service, etc.). The device compatibility service 131 uses information in a device database 133, or detected by a detect 315, or provided by a forum process 317 of the subscription service, if any, to provide a response to the service platform 121. The service platform then provides a response to the UE client 107 based on the capabilities of the UE device hosting client 107. Based on these results the service platform will provide the suitable service to the client 107 or alerts the client 107 of incompatibility with the service.

The embodiment discussed in FIG. 3 has the advantage that a history of information can be built-up in a declarative manner while also exposing that information to further processing by additional agents (not shown here) and also a natural two-way implicit communication between each of the modules (e.g., device compatibility service 131 and export control interface 137) and devices (e.g., UE 103) using the implicit information sharing paradigm.

Communication among platforms in FIG. 2 and FIG. 3 can be conducted using various types of interfaces such as Representational State Transfer (REST) API, Simple Object Access Protocol (SOAP) API, etc.

Figure 5A:
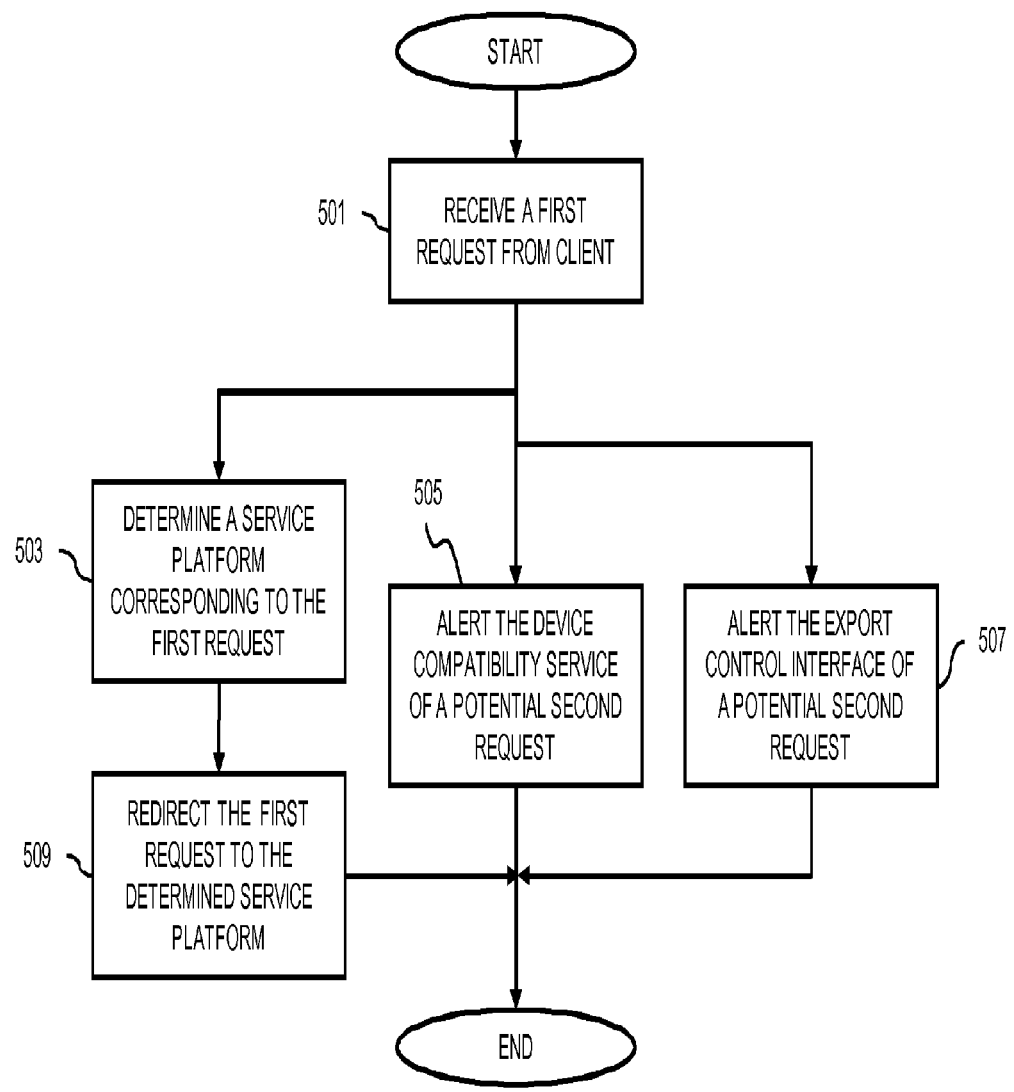
FIG. 5A is a flowchart of a process for alerting other platforms about a potential device compatibility request, according to one embodiment.

FIG. 5A is a flowchart of a process for alerting other platforms about a potential device compatibility request, according to one embodiment. In step 501, the link redirector 135 receives a service request from a client 107 including client identification information. By way of example, this can be a request for a service such as a video, audio, software, etc. In step 503, the link redirector 135 determines a service platform (server) 121 that can provide the requested service to the client 107. The link redirector 135 may select a from among a group of servers or providers associated with the service platform 121, for example, based on availability, current status, current service request load, etc.

In step 505, the link redirector 135 sends an alert to the device compatibility service 131 including the service requesting device identification and the service requested. In certain embodiments, the step 505 may be performed in parallel with step 503. This alert triggers the device compatibility service 131 to start preparing compatibility information corresponding to the service requesting device and pertinent to the service requested. In step 507, the link redirector 135 sends a similar alert to the export control interface 137. In certain embodiments, the step 507 may be performed concurrently with the steps 503 and 505. In addition to the service requesting device identification and the requested service, the alerts to the device compatibility service 131 and the export control interface 137 may include other information such as the current location of the service requesting device which can be used by the export control interface 137 for investigating the availability of the requested service in that geographic location or any restrictions that might apply.

In step 509, the link redirector 135 forwards the service request to the service platform 121 determined at step 503. The forwarding can be either by returning an IP address associated with the service platform 121 that is providing the service or by relaying the service request which includes client's identification information directly to the service platform 121.

It is noted that the fact that steps 505 and 507 can be performed in parallel with steps 503 and 509 means that the alerts can be sent at the same time as service determination, so that the device compatibility service 131 and the export control interface 137 can start preparing a response before they receive a device compatibility request or an export control request from a service platform and once they receive the requests, their response can be partially or completely ready.

Figure 5B:
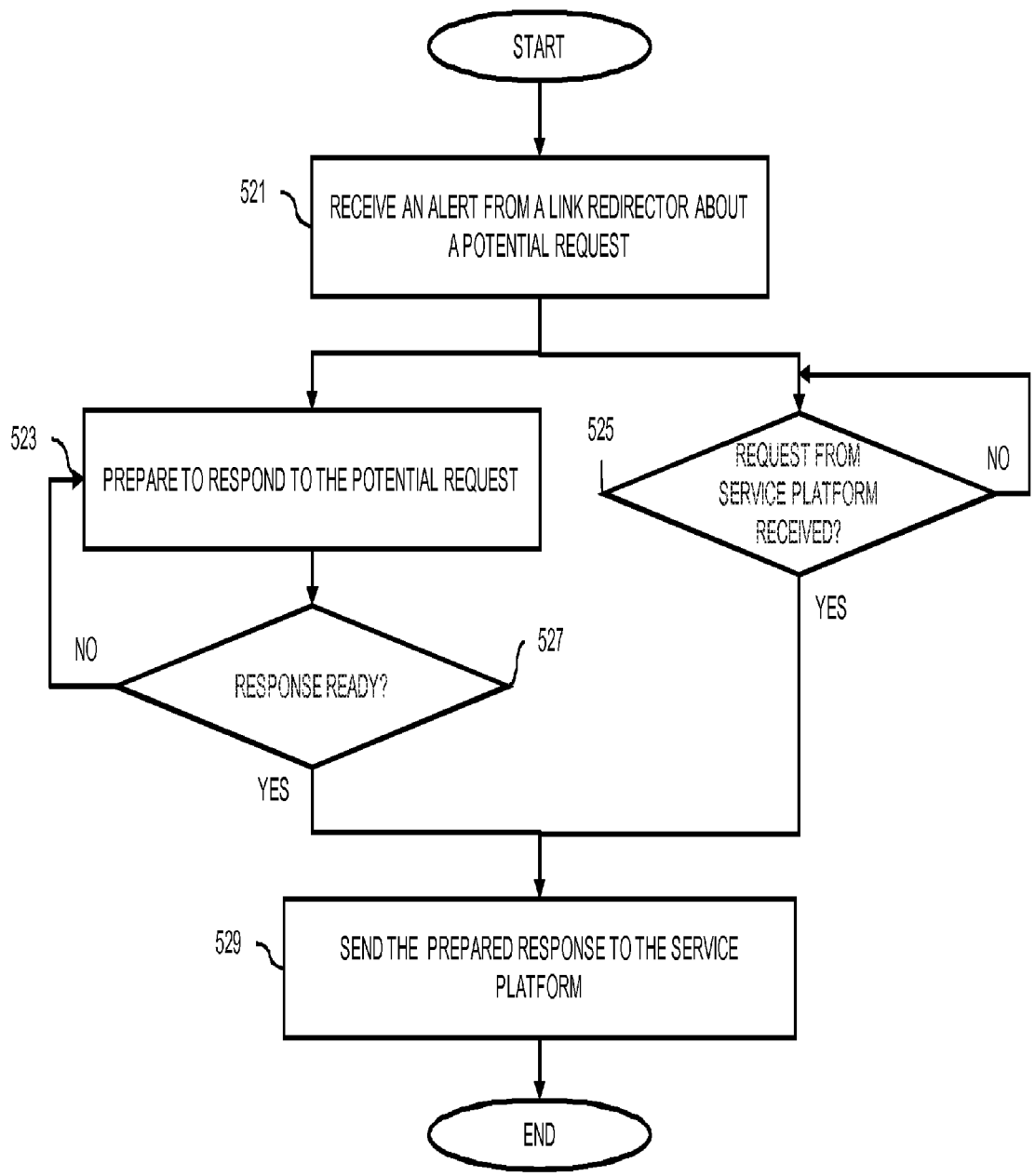
FIG. 5B is a flowchart of a process for preparing to respond to a potential device compatibility request triggered by a received alert, according to one embodiment.

FIG. 5B is a flowchart of a process for preparing to respond to a potential device compatibility request triggered by a received alert, according to one embodiment. FIG. 5B shows the operation of device compatibility service 131 or export control interface 137 after receiving an alert from link redirector. In step 521, an alert is received from the link director 135 about a potential device compatibility request or an export control request, including the requesting device identification, the service requested, the requesting device location, etc. In step 523, the module receiving the alert (e.g., the device compatibility service 131 or the export control interface 137) starts preparing a response to the potential request and stores the prepared information in a memory location such as a cache. In step 525 the module receiving the alert (e.g., the device compatibility service 131 or the export control interface 137) is expecting to receive the device compatibility request or an export control request from service platform 121. For example, the device compatibility service 131 may search for compatibility information in manufacturers' manuals, various online and offline user forums related to the requested service, etc., and may store the search results in a device database for further use when it receives requests from similar devices. As another example, the export control interface 137 may retrieve export control information from regulatory documents, international agreements, copyright information specific to each service, etc.

When a device compatibility request is received from the service platform, in step 527, the module determines whether a response to either a potential or actual device compatibility request is ready (e.g., complete) for transmission to the requesting service platform 121. If the response is ready, the module initiates sending of the response to the service platform 121 as per step 529. If the module has not completed preparing its response to a potential device compatibility request before receiving the actual request, there may still be some delay in responding to the actual received request as the module completes its response. However, the delay, if any, will be minimized because the module has already started preparing based on the alert the module received from the link redirector 135. Furthermore, since device compatibility service 131 and export control interface 137 are more than likely running on more powerful hardware with faster network connections, with a high probability by the time the request is received the response can be ready.

In one embodiment, the module can perform the steps 523, 525, and 527 concurrently to further reduce delay and improve response time. As a result, by the time the request is received all or part of the response can be prepared.

Figure 6A:
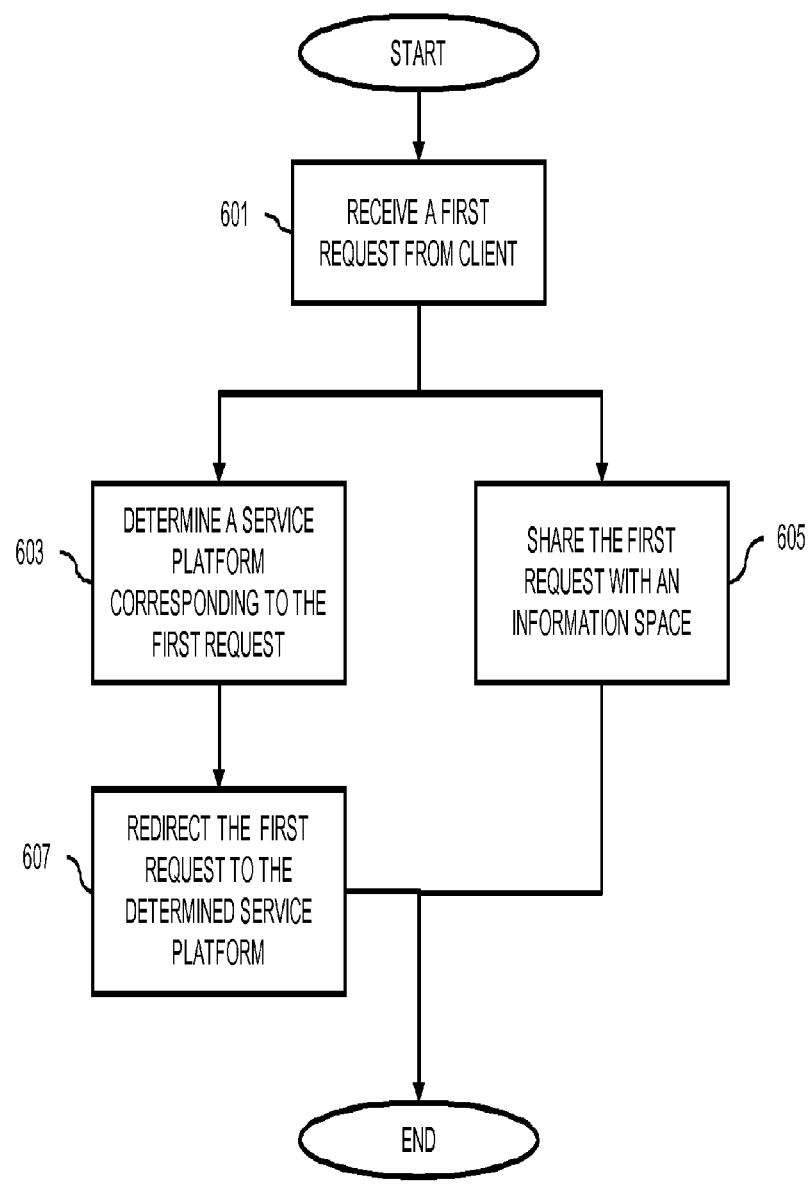
FIG. 6A is a flowchart of a process for sharing potential device compatibility requests with other platforms through an information space, according to one embodiment.

FIG. 6A is a flowchart of a process for sharing potential device compatibility requests with other platforms through an information space, according to one embodiment. In step 601, the link redirector 135 receives a service request from a client 107 including client identification information. This is a request for a service such as a video, audio, software, etc. In step 503 the link redirector determines a service platform (server) 121 that can provide the requested service to the client 107.

In step 605, the link redirector stores the service request including the requesting device identification, the service requested, the current location of the requesting device, etc. in a shared information space so that the device compatibility service 131 and the export control interface 137 can access the information from the information space. In step 607, that can be executed concurrently with step 605, the link redirector forwards the service request to the determined service platform 121. The redirection can be either by returning an IP address associated with the client 107 or by relaying the service request which includes client's identification information directly to the service platform 121.

It is noted that the fact that step 605 can be performed concurrently with steps 603 and 607 means that the service request information can be shared at the same time as service determination and service request redirection, so that the device compatibility service and the export control interface can start preparing a response by accessing shared information before they receive a request.

As explained in the description of FIG. 3, in one embodiment, the information space can be programmed to send signals to subscribed systems such as device compatibility service 131 and export control interface 137, informing them about changes in the content and the new service requests received.

Furthermore, existence of a shared information space enables any two subscribed modules to engage in two-way communications through the shared information space, if allowed by their subscription and their predefined level of authority. The two-way communication enables the modules to exchange information regarding request status, response contents and status, the shared information space updates, etc. For example, the device compatibility service 131 and the export control interface 137 may be required to alert each other about the completion level of the response preparation. For instance when the process of response preparation by the device compatibility service 131 is completed, the device compatibility service can send a message through a knowledge processor 401 to the information space 311 stating that the response to the compatibility service is ready. This message can be inserted to the information space 311 by knowledge processor 401. Additionally, if the export control interfaces 137 needs information on whether the response providing process by the device compatibility process 131 is complete, the export control interface 137 can contact the information space 311 through a knowledge processor 401 and make a query regarding the completion of device compatibility process. The query result will be extracted from the information content of the information space 311 by internal operations such as "projection" which extract information from an information system while the content of the information system remains intact. The query result is then returned to the export control interface 137 through the knowledge processor 401. In this way a two-way communication between a device compatibility service 131 and an export control interface 137 can be performed via the information space 311 and the access authority regulations for various system components can be centralized within the scope of the information space 311 rather than being distributed among the modules and therefore the regulations can be applied in a more consistent manner.

Figure 6B:
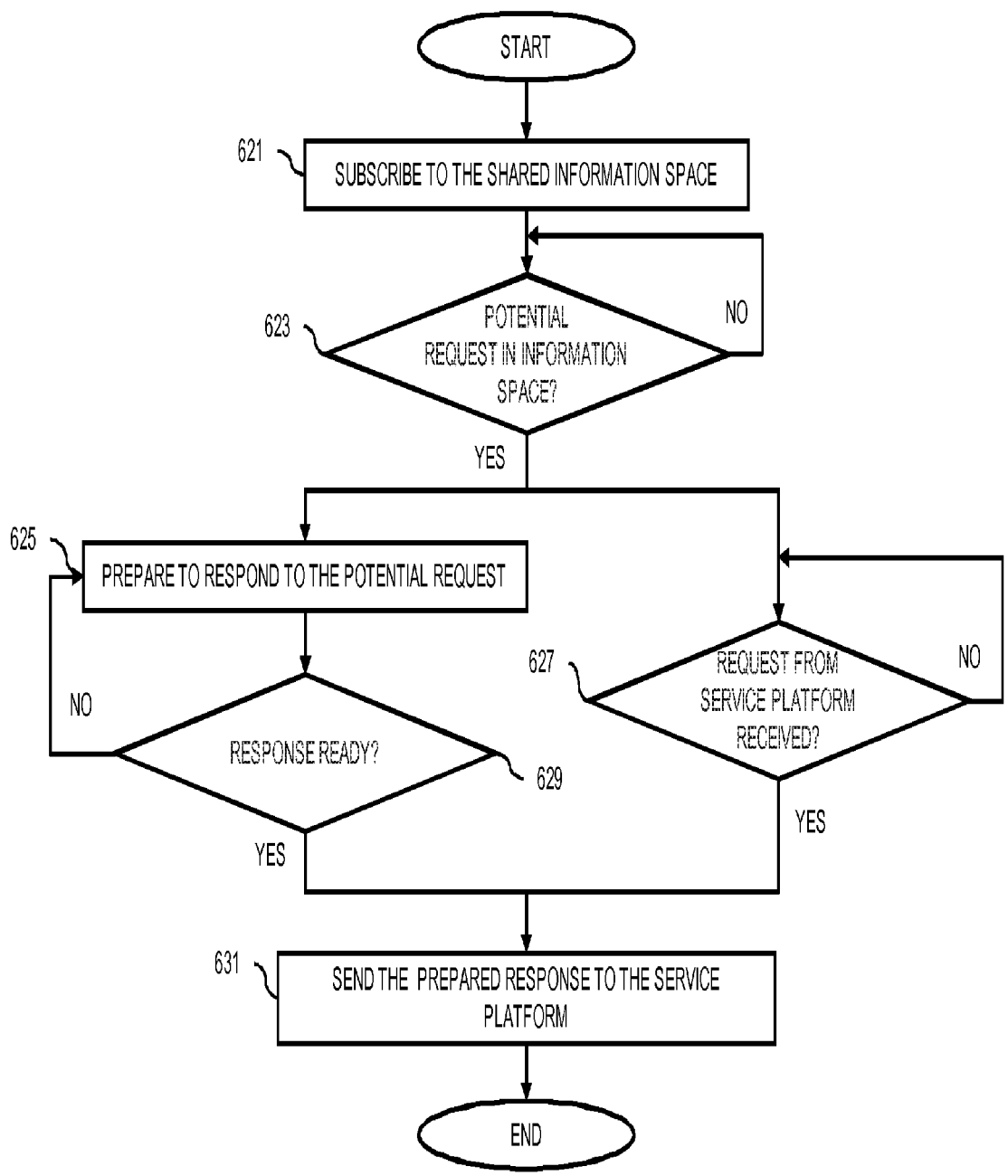
FIG. 6B is a flowchart of a process for preparing to respond to a potential device compatibility request triggered by an information space entry, according to one embodiment.

FIG. 6B is a flowchart of a process for preparing to respond to a potential device compatibility request triggered by an information space entry, according to one embodiment. FIG. 6B shows the operation of device compatibility service 131 or the export control interface 137 with regards to a shared information space, according to one embodiment. In step 621, the module subscribes to the information space in order to be able to access the content of the information space, to receive messages about updates in the information from the information space, and to be able to communicate with other modules through the information space. Step 623 indicates that as soon as a new service request has been stored in the information space 311 by link redirector 135, the module running this process will be informed by information space 311 of the updates. The module will receive a signal from the information space regarding the new service.

In step 625 the module (device compatibility service or export control interface) starts preparing response to the potential request and stores the prepared information in a memory location such as a cache while as per step 627 the module is expecting to receive the compatibility request from service platform 121. According to one embodiment, step 629 that can be executed concurrently with step 625, and the device compatibility service 131 or the export control interface 137 checks the process of response preparation.

When a device compatibility request or an export control request is received from the service platform, in step 629, the module determines whether a response to either a potential or actual device compatibility request is ready (e.g., complete) for transmission to the requesting service platform 121. If the response is ready, the module initiates sending of the response to the service platform 121 as per step 631. If the module has not completed preparing its response to a potential request before receiving the actual request, there may still be some delay in responding to the actual received request as the module completes its response. However, the delay, if any, will be minimized because the module has already started preparing based on the alert the module received from the information space 311. Furthermore, since the device compatibility service 131 and export control interface 137 are more than likely running on more powerful hardware with faster network connections, with a high probability by the time the request is received the response can be ready.

In one embodiment, the module can perform the steps 625, 627, and 629 concurrently to further reduce delay and improve response time. As a result, by the time the request is received all or part of the response can be prepared.

Figure 7:
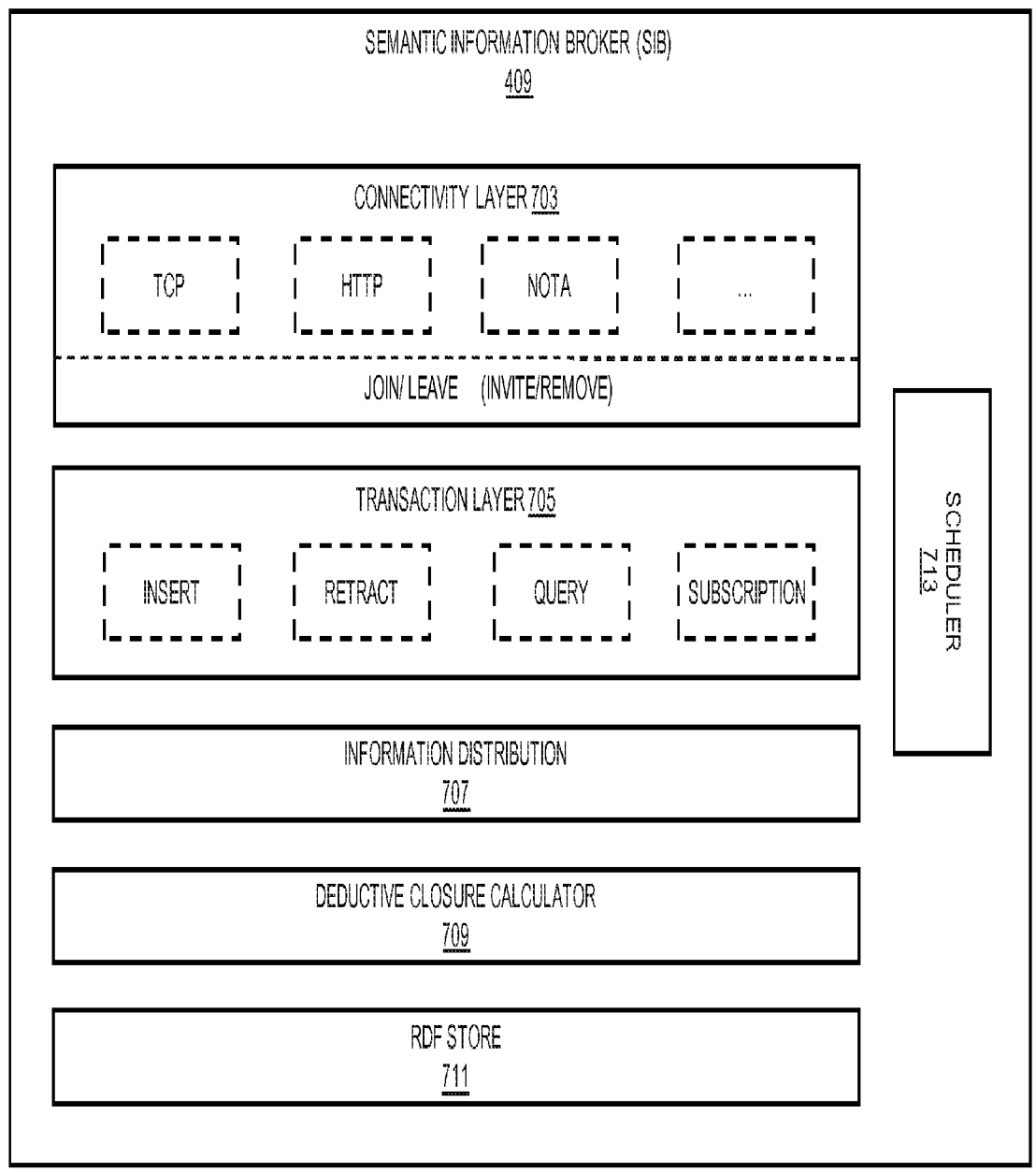
FIG. 7 is a diagram of internal structure of a semantic information broker, according to one embodiment.

FIG. 7 is a diagram of internal structure of a semantic information broker, according to one embodiment. The physical embodiment of an information space 311 is through semantic information brokers (SIBs) 409 which contain connectivity component 703 that includes subscription mechanism 313 for managing subscriptions for information changes, processing transactions (insertions, retractions, queries) 705 from knowledge processors 401, storing and distributing information 707, computing deductive closures 709 over that information. The SIB 409 also includes a storage 711 for RDF graphs and a scheduling mechanism 713 for any internal components and connectivity mechanisms. The information storage is made by the RDF store 711 and presented via a deductive closure mechanism 709 for computing an extended result over the stored graph.

The rules stored in a SIB's lowest layer RDF store 711 are usually those which are static in nature, for example RDF rule for transitivity of the sub-class relationship can be represented as following:

$\Gamma,\alpha$ rdfs: subClassOf $\beta$, $\beta$ rdfs: subClassOf $\gamma \rightarrow \Gamma,\alpha$ rdfs: subClassOf $\gamma$ The above rule indicates that in information space $\Gamma$, if RDF graph $\alpha$ is a sub-class of RDF graph $\beta$, and RDF graph $\beta$ is a sub-class of RDF graph $\gamma$, then the RDF graph $\alpha$ will be a sub-class of RDF graph $\gamma$. Other rules are formulated similarly.

According to certain embodiments, within this framework, these rules may be dynamically changed as the system is running. Moreover, more specific rules may be added depending on the currently stored information or for some ontology to specialize the behavior of the information space as a whole. Subsequent additions to the deductive closure mechanism 709 can take into consideration non-monotonic logics and specifically default logic. The rule set for deductive closure is maintained across all SIBs 409 when more than one SIB is representing an information space, thus consistency between the SIBs is preserved when queries are made.

The transaction layer 705 contains the mechanisms for inserting, retracting and querying information as well as pre-processing the transactions. The subscription mechanism is part of the transaction layer as well. This process effectively calls the query mechanism to check for updated information. Subscriptions fire when there is a difference in query result from the previous firing of a subscription.

The transaction layer 705 is managed by a scheduling component 713 which orders the components within this layer according to the following schedule: (1) insertions and retractions; (2) any internal components; and (3) queries and subscriptions. This provides both a mechanism for internal customization of the SIB 409 through internal knowledge processors and a 'sand-boxed' execution environment as a mechanism for governing network latencies both between knowledge processors 401 and the SIB 409 and between individual SIBs when more than one SIB is representing the information space.

The top-most layer the connectivity layer 703 contains the connectivity components which process the incoming and outgoing requests to and from knowledge processors 401 specifically implementing the information space protocol. Within this layer are found 'listeners' which support the information space application protocol on various transport protocols such as Transmission Control Protocol/Internet Protocol (TCP/IP), HTTP (S), NoTA, Universal Plug and Play (UpNP) and connectivity media such as Ethernet, WLAN, Bluetooth, etc.

NoTA is an open architecture initiative developed with the primary goal to agree on a unified way to integrate, communicate and define module interfaces in embedded devices. This enables different developers to independently innovate, develop, optimize and verify modules that are interoperable. The model resembles the logic behind Internet protocols. A set of common communication protocols and certain rules on how nodes can utilize these protocols are defined. The result is a platform that fosters new independent innovations and provides a basis where innovations can grow and evolve. More details on NoTA initiative can be found on http://www.notaworld.org.

UPnP forum is an industry initiative of leading companies in computing, printing and networking, consumer electronics, home appliances, automation, control and security, and mobile products. The Forum's goals are to allow devices to connect seamlessly and to simplify network implementation in the home and corporate environments. Toward this end, UPnP forum members work together to define and publish UPnP device control protocols built upon open, Internet-based communication standards. The UPnP architecture offers pervasive peer-to-peer network connectivity of PCs of all form factors, intelligent appliances, and wireless devices. The UPnP architecture is a distributed, open networking architecture that leverages TCP/IP and the World Wide Web to enable seamless proximity networking in addition to control and data transfer among networked devices in the home, office, and everywhere in between.

Additionally within the auspices of the connectivity component is the management and authentication of knowledge processors 401 in terms of their rights to utilize and share information within the information space 311. Knowledge processors 401 either joins or is invited by the information space 311, and then pass credentials such that the information space can evaluate their suitability. Information spaces 311 additionally reserve the rights to revoke any knowledge processor's membership to an information space at any time.

The credentials employed may include information about the knowledge processor 401's identity, security keys and even physical location (obtained through some positioning mechanism such as GPS) thus allowing the information space 311 to take on real-world physical bounds.

The function of information distribution module 707 is explained hereafter. An information space 311 is a logical construct, and is represented by one or more SIBs 409 which internally synchronize their respectively stored information between them. The SIBs 409 forming an information space 311 have two key properties: first, connections between SIBs 409 form a totally routable network, and second, regardless of the SIB 409 that a knowledge processor 401 uses to connect to the information space 311, the full set of information is always available to any connected knowledge processor 401. These properties mean that the union of the information in the SIBs 409 accessible over the reflexive transitive closure over the routing graph is the same regardless of the SIB 409 representing the information space 311. IF S is the set of SIBs 409 in a given information space 311 and I(s) is the information stored in a given SIB 409, then the information available in the information space 311 (I SPACE) is the union of informations from each SIB 409:

$$I_{SPACE} = \bigcup_{s \in S} I(s)$$

and if r(s) is the set of SIBs 409 directly routable from some given SIB s then:

$$\forall s \in S | I_{SPACE} = i(r(s)^+)$$

The information contained within each individual SIB 409 is generally overlapping. This can be exploited to provide a significant amount of information redundancy and fault tolerance. SIBs 409 connected in such a totally routable network can exchange routing information to assist in preserving the connectivity under failure or faulty conditions. Inserts, retracts (also updates) and queries are distributed over all the SIBs 409 representing the given information space 311 depending on whatever policies about synchronization of information between the individual SIBs 409 are in place.

There are several reasons for making the synchronization asymmetric as is implied above. Some of these reasons include: availability of computing resources, particularly storage; bandwidth of network connections available; security and privacy considerations; stability of the SIB 409 in terms of computing resources available; and legal issues.

In the case of queries, each SIB 409 returns back as much information pertaining to the query as possible. This information is aggregated and a deductive closure calculation is made over the returned set of information. The invariant over this is that the result of a query under distributed conditions will be the same as a query when all the information is present in a single SIB 409.

The deductive closure calculator 709 can be optimized by computing the closure on the most suitable SIB 409 and then further returning the query to the original requester from there. Suitability depends upon local processing power, memory availability and other resources as necessary. Further optimization can be made in the case of orthogonal components of a query which can be distributed over the SIBs 409 in their own right.

Figure 8:
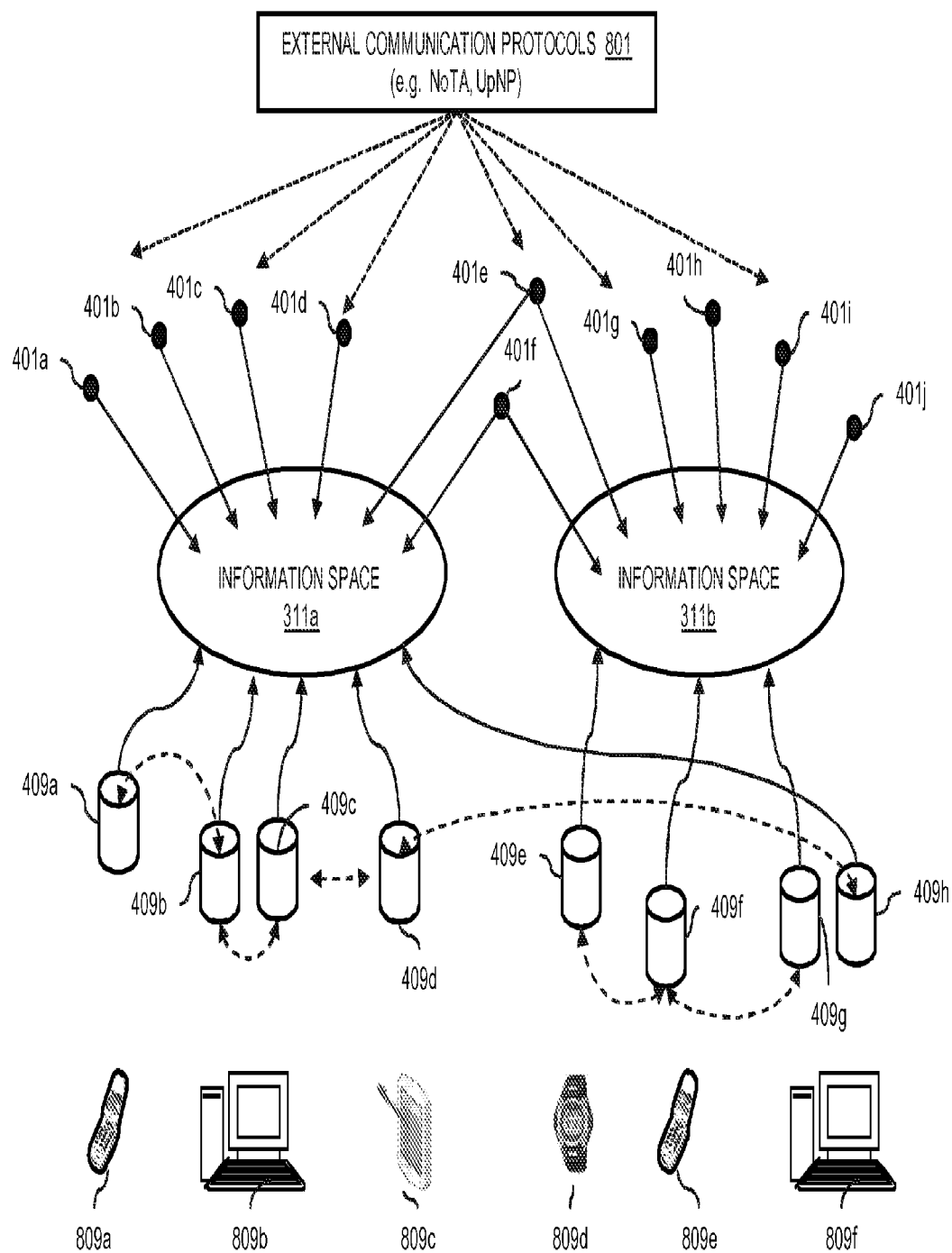
FIG. 8 is a diagram of information space configuration, according to one embodiment.

FIG. 8 is a diagram of information space configuration, according to one embodiment. In FIG. 8 two information spaces 311*a* and 311*b* are connected to knowledge processors 401*a*-401*j*. Some of the knowledge processors such as 401*e* and 401*f* are connected to more than one information spaces. In addition, some knowledge processors 401 use external communication protocols 801 outside of the information spaces environment. For example knowledge processors 401*c*, 401*d* and 401*e* may be connected through the NoTA network while knowledge processors 401*e*, 401*g* and 401*i* are connected through UPnP network.

Additionally the semantic information brokers 409*a*-409*h* are distributed over a number of different devices. For example, 409*a* is on device 809*a* and 409*b* and 409*c* are on device 809*b*. However as seen in FIG. 8 each set of SIBs represent one information space at a time. For example, SIBs 409*a*-409*d* and 409*h* represent information space 311*a* while SIBs 409*e*-409*g* represent information space 311*b*. Some devices can run more than one SIB representing different information spaces concurrently. For example device 809*f* runs SIB 409*g* which represents information space 311*b* and at the same time runs the SIB 409*h* that represents information space 311*a*.

The system can be implemented on various platforms including mobile devices, personal computers, etc. The main requirement of such implementation platforms is that the devices support the runtime environments and that enough processing power and storage is available. Given that knowledge processors 401*a*-401*j* can be distributed over devices with more processing power and/or storage as necessary, usually smaller hand-held devices are adequate for running these knowledge processors.

In one embodiment, the SIB 409 runs on systems supporting the Python runtime environment and additionally versions for C++ specifically exist for Linux/Unix and Open-C for Symbian operating system, the most widely used open operating system for mobile phones. Client libraries for knowledge processors 401 exist in Python, C, C++ (Linux/Unix and Symbian) as well as Java. Other environments based on Web services and Javascript can also be used.

In another embodiment, the system implementations run on Mobile Devices (including: N800/810, N95) and personal computers (Unix, Linux, Windows). The knowledge processors 401 can run on sensors, etc. Communication is made over TCP/IP and HTIP protocols which can be used over Ethernet, GPRS and 3G transports.

Within an information space 311 and thus within the individual information stores in each SIB 409 that makes up that information space 311, information is represented as a graph and conforms to the rules of the Resource Description Framework (RDF). This graph can be stored using Wilbur RDF store.

The basic operations on an information store are insertion of a graph, retraction (deletion) of a graph, querying and subscription for information. Insertion and retractions may be combined into a single transactional structure in order to admit atomic updates through the atomic application of retract and insert. Both insertion and retraction can be based on the simplest semantics as follows:

$$\Gamma, \text{insert}(\phi) \rightarrow \phi \in \Gamma$$

$$\Gamma, \text{retract}(\phi) \rightarrow \phi \notin \Gamma$$

All other forms of operations are constructions and refinements of the above. For example, update is constructed out of a set of retracts and inserts.

Further rewrite rules can simplify the recurrent application of operations. For example:

$$\Gamma, \text{insert}(\phi), \text{insert}(\phi), \ldots, \text{insert}(\phi) \Leftrightarrow \Gamma, \text{insert}(\phi) \qquad (1)$$

$$\Gamma, \text{retract}(\phi), \text{retract}(\phi), \ldots, \text{retract}(\phi) \Leftrightarrow \Gamma, \text{retract}(\phi) \qquad (2)$$

$$\Gamma, \text{insert}(\phi), \text{retract}(\phi) \rightarrow \Gamma \rightarrow \Gamma \qquad (3)$$

Rule (1) above shows that repeated insertion of a certain information into the information store is equivalent of inserting the information once. The same concept is true for the retraction as seen in rule (2). And rule (3) shows that insertion and retraction of an information would leave the information store unchanged. These rules can be modified based on trust and uncertainty conditions. Usually the rules are applied in specific orders in order to preserve as much of a transaction as possible.

In one embodiment, a query is evaluated based on the current snapshot of the information in the information space 311. Queries can be performed by Wilbur query language (WQL) or simple RDF triple pattern matching. WQL is a lisp-like path based query language. One important difference between WQL and RDF triple pattern matching is that Wilbur's static reasoning engine only runs with WQL queries. WQL queries return a set of RDF graph nodes, while the pattern queries return an RDF graph. Furthermore, other query languages such as SPARQL are also supported.

In another embodiment, subscriptions are implemented as persistent queries, that is, a given query is evaluated whenever the information in the information space 311 changes, and thus the same methods are available. The results are transmitted to the knowledge processor 401 only when they are changed. Depending on parameters, either the full results or a differential is transmitted.

According to the stated ontologies, no attempt is made by the information space 311 to enforce consistency or integrity of information. However, internal reasoning knowledge processors 411 may be present which can perform this activity if the information space 311 has been configured accordingly. Information is explicitly semi-structured and may take on any form that the knowledge processors 401 insert or retract.

Presence of typing constructs and namespaces does not necessarily mean that a knowledge processor 401 querying for that information will interpret the information according to the implied ontology. A namespace is an abstract container or environment created to hold a logical grouping of unique identifiers or symbols (e.g. names). The semantics of the information is interpreted by the reader, merely implied by the writer and grounded in the real world context of the knowledge processor 401. Therefore, any two given knowledge processors may disagree about the semantics. This concept is generally referred to as pragmatic or intentional semantics.

Apart from allowing atomic insertion and retraction of graphs of information and scheduling of the internal reasoners no transaction or other consistency policies are enforced in order to increase possibilities for system use and the expense of leaving the coordination problem to the user.

With no atomicity and synchronization enforced, two methods of coordination namely external coordination and ontological coordination can be used.

In the case of external coordination, while knowledge processors 401 are anonymous inside the system, they are free to publish information about how they might be contacted externally. This is the technique used in constructing agent-based NoTA and UPnP systems. This however has the disadvantage of making the information space in some cases little more than a database of addresses and published functionality; although in the UPnP and NoTA cases the state of the system as a whole is stored and its manipulation is allowed. This solution is particularly useful when augmenting and complimenting legacy systems.

In the case of ontological coordination, all synchronization constructs need to be explicitly specified in an ontological way, that is making events, semaphore/monitor structures into first-class elements that can be represented in RDF form. A simple example of this is provided through an event hierarchy ontology or by adding temporal constructs to an existing ontology.

The information space 311 provides further functionality regarding the joining and leaving of knowledge processors 401 and policy management. Knowledge processors 401 have a set of credentials which are passed during the "join" operation. The counterparts of the knowledge processor 401 instantiated "leave" and "join" operations are the information space 311 instantiated "invite" and "remove" operations. These operations are not necessarily provided by every information space 311 nor understood by every knowledge processor 401.

These operations are used to provide a limited set of security related functionalities which at least guard the information at the level of granularity of an information space 311. These options do not protect from instances where one knowledge processor 401 might be connected to two or more information spaces 311 and physically copy information nor do they protect from information corruption and other operations on the information space 311. These kinds of finer leveled granularity of security are provided by other means and are not specifically addressed in the current architecture.

Connectivity is provided through a set of listeners which provide access via any given specified transport protocol. TCP/IP is the most used transport, but a Bluetooth based listener or one that uses HTTP/S have also been developed. Listeners can provide pre-processing of the incoming messages if necessary; for example with Bluetooth profiles. Any number of listeners may be provided at any time (at least one is necessary).

Furthermore and in some respects similar to that of the principles of information distribution, the connectivity of an information space can also be seen as a union of all listeners in all SIBs 409. However, not all listeners may be available on all physical locations (consider Bluetooth or TCP/IP over WLAN for example).

Figure 9:
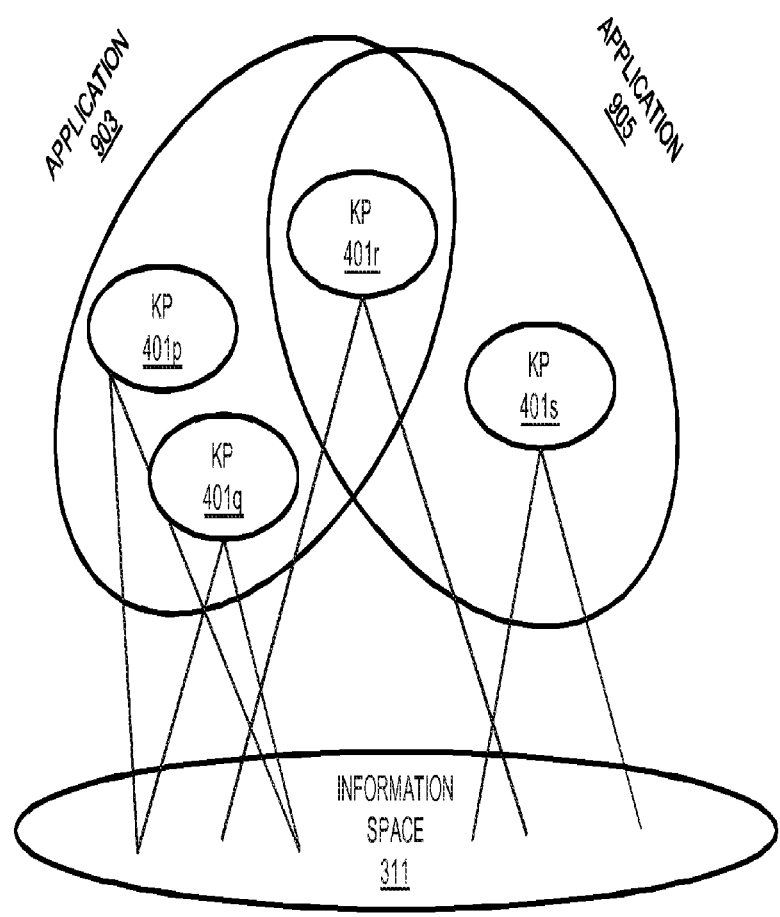
FIG. 9 is a diagram of applications in an information space environment, according to one embodiment.

FIG. 9 is a diagram of applications in an information space environment, according to one embodiment. The applications of information spaces 311 emerge from the interaction, knowing or unknowing, of distinct knowledge processors 401p-401s connected to an information space 311. In one embodiment, as a prerequisite for interaction between knowledge processors 401, the set of information that they understand must overlap. The interaction may also be indirect in a sense that the knowledge processors may have an effect on each other's behavior over a chain of other knowledge processors through their shared information. In FIG. 9, two applications 903 and 905 are defined on information space 311. Application 903 includes knowledge processors 401p, 401q and 401r and application 905 includes knowledge processors 401r and 401s. As seen in FIG. 9, knowledge processor 401r is the only shared knowledge processor between the two applications and therefore the knowledge processors of the two applications 903 and 905 can only interact through knowledge processor 401r.

In order for an application to be used by human users, some kind of user interface is needed on at least some of the knowledge processors 401 of the application. The user interface paradigm for information space based applications is likely to differ from the traditional user interfaces, as it has to be much more modular and dynamic than traditional interfaces and particularly centered around the distributed nature of such knowledge processors.

Figure 10A:
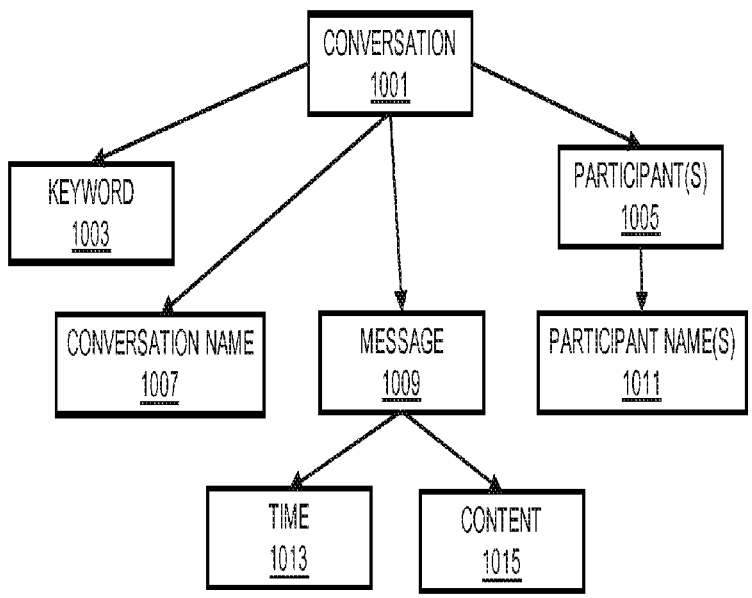
FIG. 10A is a diagram of an ontology for a sample application constructed from knowledge processors, according to one embodiment.

FIG. 10A is a diagram of an ontology for a sample application constructed from knowledge processors, according to one embodiment. In this example a simple system for posting natural language messages to an information space 311 is considered. The system can be viewed as an information space based chat system. The functionality of this system can be broken up into several distinct knowledge processors for example including "message writing knowledge processor", "message listening knowledge processor", "conversation creator knowledge processor" and "conversation listing knowledge processor". This kind of radical division of functionality provides the flexibility that each piece of the system can run on a different platform if needed. For example, the message listener may be running on a laptop computer with a rather large screen while the message writer is running on a hand-held device. All knowledge processors should agree on a messaging ontology informally described in FIG. 10A and this allows them to interoperate.

The ontology of FIG. 10A indicates that a conversation 1001 is made up of 4 components a keyword 1003, at least one participant 1005, a conversation name 1007 and a message 1009. Similarly a participant 1005 will have a name component 1011 and a message 1009 has a time component 1013 and a content 1015.

At any point in time there are a number of instances of knowledge processors theoretically distributed amongst any number of devices. In this chat example each human user would need four knowledge processors, "a message viewer", "a message writer/sender", "a conversation list viewer" and a "knowledge processor to join and leave conversations". The actual distribution of functionality may vary depending on implementation.

Specifically the viewer knowledge processors would subscribe to particular parts of the information in the information space 311, for example in Wilbur Query Language (WQL) one might write the following query to obtain the list of current conversations:

ns # Conversation|(:inv !rdf:type)

where ns represents a namespace declaration. This query returns a set of URIs which are from type ns # Conversation. In order to obtain messages in a given conversation, for example a message with the URI xyz, the following query can be written:

xyz|(:seq messages)

And in order to obtain the message writer's name, message contents and the URI of the messages to which this is a reply, a pseudo-code is written:

for each m in xyz|(:seq messages): writer :=m|(:seq writer)
content :=m|(:seq content) reply to :=m|(:seq replyTo)

This function would be called every time the set of results returned by the original subscription changes, for example when a knowledge processor 401 enters a new message into the given conversation.

A meaningful situation for this example occurs when there are more than one active participants, which entails that each participant has enough knowledge processors 401 in order to fulfill the scenario of having a conversation. This does not mean that each participant in this case would have four knowledge processors, one of each four types mentioned. It is possible, and desirable, that the user might have a number of each knowledge processors distributed amongst their devices to allow for example, viewing of messages to be made in many places. The possibility of not having any knowledge processors of some type is also permissible although this restricts the functionality perceived by that user of the system, situations such as when someone wishes to only view messages.

The fact that the messages persist in the information space 311 and are visible to all connected knowledge processors 401 allows easy extension of the system functionality. For example, a weather report gatherer knowledge processor 401 which inserts weather information into an information space 311 is considered.

Figure 10B:
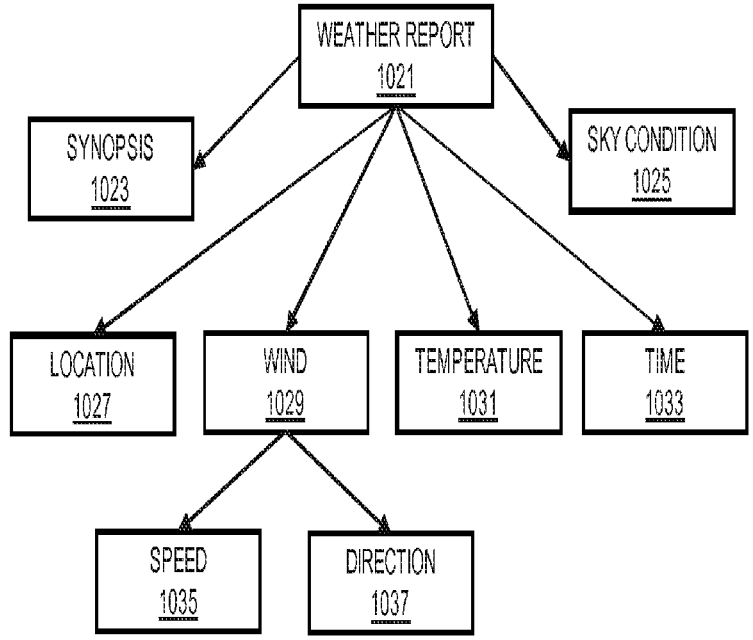
FIG. 10B is a diagram of an ontology for a sample application constructed from knowledge processors, according to one embodiment.

FIG. 10B is a diagram of an ontology for a sample application constructed from knowledge processors, according to one embodiment. FIG. 10B shows a simple weather ontology for this example. As seen in FIG. 10B a weather report 1021 is made up of 6 components synopsis 1023, sky condition 1025, location 1027, wind 1029, temperature 1031 and time 1033, while wind component is identified by speed 1035 and direction 1037.

A knowledge processor 401 can be added to the conversation system to monitor all or some existing conversations and look for place names in conversations. The new knowledge processor 401 will make similar subscription as the message viewer and scan the text of each message for known place names.

As mentioned before, communication among knowledge processors 401 is made indirectly through a shared set of information. Each knowledge processor 401 has a view of the "world" based on a given semantic domain that is the set of concepts that the knowledge processor 401 can reason about. The semantic domain can be provided by some folksonomy or ontology. The knowledge processors also have access to a set of information conforming to that ontology. This is defined by the types of interactions with the information space 311*a* knowledge processor 401 can make. The knowledge processors 401 provide the information with the intent that the information will be read with the same (or similar) semantics to which it was intended.

The knowledge processor 401 reading the information will only interact if the set of information that it has interested intersects with the set of information by the writing knowledge processor. Sensible communication only results if the semantic domains of the knowledge processors are aligned sufficiently and alignment of the semantic domains can be achieved through agreement by the parties defining the ontologies or folksonomies used. If a weather report for a certain place name is found, the knowledge processor links the relevant parts of the weather report for that place to the relevant conversation as messages.

Figure 11:
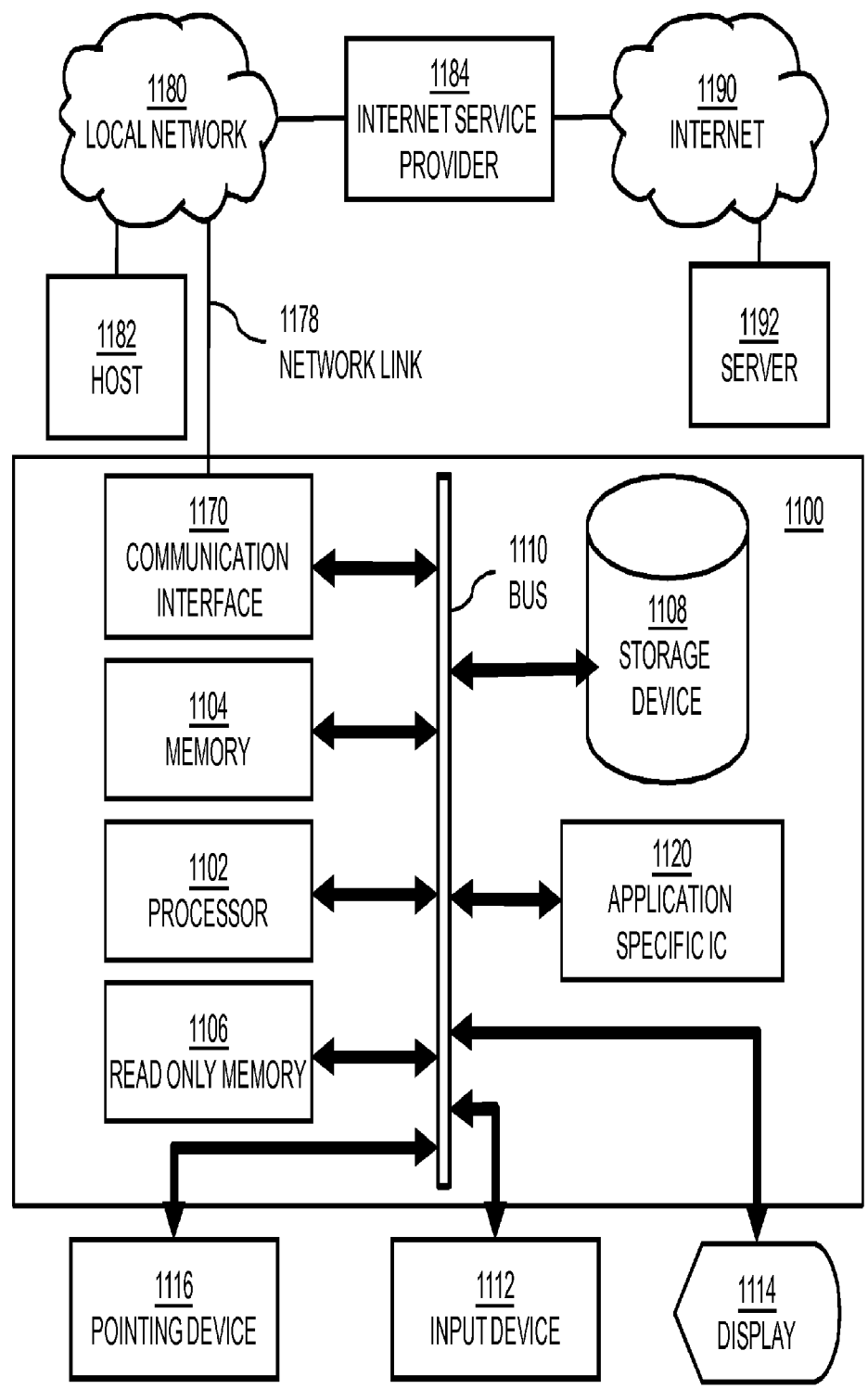
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to acquire device attributes from multiple sources as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of device attributes acquisition from multiple sources.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to device attributes acquisition from multiple sources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for device attributes acquisition from multiple sources. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for device attributes acquisition from multiple sources, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing device attributes acquisition from multiple sources to the UE 103.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
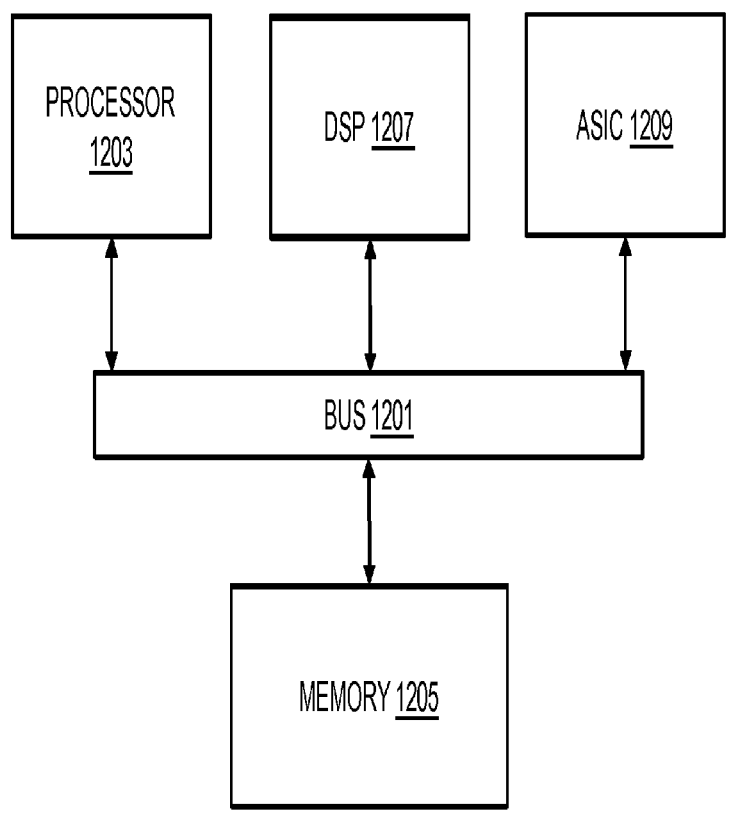
FIG. 12 is a diagram of a chip set that can be used to implement an embodiment of the invention.

FIG. 12 illustrate a chip set 1200 upon which an embodiment of the invention may be implemented. Chip set 1200 is programmed to acquire device attributes from multiple sources as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of device attributes acquisition from multiple sources.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to acquire device attributes from multiple sources. The memory 1205 also stores the data associated with or generated by the execution of the inventive steps.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of device attributes acquisition from multiple sources. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of device attributes acquisition from multiple sources. The display unit 1307 includes display circuitry configured to display at least a portion of a user interface of the mobile terminal (e.g., mobile telephone). Additionally, the display unit 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LIE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1145, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to acquire device attributes from multiple sources. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module can reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method comprising:
receiving, at a device compatibility service node, an alert indicating a potential device compatibility request potentially originating from a service platform that provides a service, the alert comprising device identification data associated with a client that is requesting to access the service, the potential device compatibility request corresponding to an actual device compatibility request that has not yet been received at the device compatibility service node;
preparing to respond to the potential device compatibility request before the actual device compatibility request is received at the device compatibility service node; and
sending, from the device compatibility service node, the response to the service platform after the actual device compatibility request is received.

2. A method of claim 1, wherein the alert is received via an information space after a service request associated with the potential device compatibility request is received at the information space.

3. A method of claim 2, wherein the information space is provided to the device compatibility service node by at least one of signaling, subscription, and implicit two-way communication.

4. A method of claim 3, wherein the subscription is implemented as a persistent query of the information space.

5. A method of claim 3, wherein receiving the alert of the potential device compatibility request comprises:
receiving a notification of a change to information in the information space causes at least in part transmission of the changed information to the device compatibility service node; and
querying the information space to retrieve the alert.

6. A method of claim 2, wherein the information space stores a history of at least one of service requests, potential device compatibility requests, requested services, and device identification data associated with service requests.

7. A method of claim 1, wherein the alert further comprises a session key associated with the potential device compatibility request, and the session key is included in the potential device compatibility request.

8. A method of claim 1, wherein the alert is received from a link redirector.

9. A non-transitory computer-readable storage medium carrying one or more sequences of one or more instructions which, when executed by one or more processors, cause a device compatibility service node to at least perform the following steps:
receive an alert indicating a potential device compatibility request potentially originating from a service platform that provides a service, the alert comprising device identification data associated with a client that is requesting to access the service, the potential device compatibility request corresponding to an actual device compatibility request that has not yet been received at the device compatibility service node;
prepare to respond to the potential device compatibility request before the actual device compatibility request is received; and
send the response to the service platform after the actual device compatibility request is received.

10. A non-transitory computer-readable storage medium of claim 9, wherein the alert is received via an information space after a service request associated with the potential device compatibility request is received at the information space.

11. A non-transitory computer-readable storage medium of claim 10, wherein the information space is provided to the device compatibility service node by at least one of signaling, subscription, and implicit two-way communication.

12. A non-transitory computer-readable storage medium of claim 11, wherein the subscription is implemented as a persistent query of the information space.

13. A non-transitory computer-readable storage medium of claim 11, wherein the device compatibility service node, when receiving the alert of the potential device compatibility request, is further caused to perform at least the following steps:
receive a notification of a change to information in the information space causes at least in part transmission of the changed information to a device compatibility service; and
query the information space to retrieve the alert.

14. A non-transitory computer-readable storage medium of claim 10, wherein the information space stores a history of at least one of service requests, potential device compatibility requests, requested services, and device identification data associated with service requests.

15. A non-transitory computer-readable storage medium of claim 9, wherein the alert further comprises a session key associated with the potential device compatibility request, and the session key is included in the potential device compatibility request.

16. A non-transitory computer-readable storage medium of claim 9, wherein the alert is received from a link redirector.

17. An apparatus of a device compatibility service node comprising:
at least one processor; and
at least one memory including computer program code, the at least one memory and the computer program code configured to, with the at least one processor, cause the apparatus to perform at least the following,
receive an alert indicating a potential device compatibility request potentially originating from a service platform that provides a service, the alert comprising device identification data associated with a client that is requesting to access the service, the potential device compatibility request corresponding to an actual device compatibility request that has not yet been received at the device compatibility service node;
prepare to respond to the potential device compatibility request before the actual device compatibility request is received; and
send the response to the service platform after the actual device compatibility request is received.

18. An apparatus of claim 17, wherein the alert is received from a link redirector.

19. An apparatus of claim 17, wherein the alert is received via an information space after a service request associated with the potential device compatibility request is received at the information space.

20. An apparatus of claim 17, wherein the alert further comprises a session key associated with the potential device compatibility request, and the session key is included in the potential device compatibility request.

* * * * *